United States Patent
Neofytou et al.

(10) Patent No.: US 11,330,196 B2
(45) Date of Patent: May 10, 2022

(54) ESTIMATING ILLUMINATION IN AN ENVIRONMENT BASED ON AN IMAGE OF A REFERENCE OBJECT

(71) Applicant: Microsoft Technology Licensing, LLC, Redmond, WA (US)

(72) Inventors: Alexandros Neofytou, London (GB); Eric Chris Wolfgang Sommerlade, Oxford (GB); Alejandro Sztrajman, London (GB); Sunando Sengupta, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/067,781

(22) Filed: Oct. 12, 2020

(65) Prior Publication Data
US 2022/0116549 A1    Apr. 14, 2022

(51) Int. Cl.
*H04N 5/262*     (2006.01)
*G06K 9/46*      (2006.01)
(Continued)

(52) U.S. Cl.
CPC ......... *H04N 5/2621* (2013.01); *G06K 9/4661* (2013.01); *G06K 9/6256* (2013.01);
(Continued)

(58) Field of Classification Search
CPC ............. H04N 5/2621; H04N 5/23219; H04N 5/2351; H04N 19/46; H04N 19/17;
(Continued)

(56) References Cited

U.S. PATENT DOCUMENTS 8,533,166 B1 *   9/2013   Sulieman .............. G06F 16/183
                                                          707/693
9,420,288 B2     8/2016   Mertens
                          (Continued)

FOREIGN PATENT DOCUMENTS

WO      2020060598 A1    3/2020

OTHER PUBLICATIONS

"Neural Illumination: Lighting Prediction for Indoor Environments"; Shuran Song, 2019 IEEE/CVF Conference on Computer Vision and Pattern Recognition (CVPR) (pp. 6911-6919) (Year: 2019).*
(Continued)

*Primary Examiner* — Michael S Osinski

(57) ABSTRACT

Technology is described herein that uses an object-encoding system to convert an object image into a combined encoding. The object image depicts a reference object, while the combined encoding represents an environment image. The environment image, in turn, depicts an estimate of an environment that has produced the illumination effects exhibited by the reference object. The combined encoding includes: a first part that represents image content in the environment image within a high range of intensities values; and a second part that represents image content within a low range of intensity values. Also described herein is a training system that trains the object-encoding system based on combined encodings produced by a separately-trained environment-encoding system. Also described herein are various applications of the object-encoding system and environment-encoding system.

20 Claims, 12 Drawing Sheets

(51) Int. Cl.
G06K 9/62 (2022.01)
G06N 3/08 (2006.01)
G06T 7/194 (2017.01)
H04N 5/232 (2006.01)
H04N 5/235 (2006.01)

(52) U.S. Cl.
CPC .............. *G06N 3/08* (2013.01); *G06T 7/194* (2017.01); *H04N 5/2351* (2013.01); *H04N 5/23219* (2013.01)

(58) Field of Classification Search
CPC ...... H04N 19/85; H04N 19/98; H04N 19/136; H04N 19/182; H04N 19/186; H04N 19/30; G06K 9/4661; G06K 9/6256; G06K 9/00268; G06K 9/00624; G06K 9/00691; G06K 9/00718; G06K 9/00744; G06N 3/08; G06T 7/194; G06T 5/009; G06T 5/50; G06T 2207/10024; G06T 2207/20208; G06T 2207/10016; G06T 2207/20081; G06T 2207/20084
See application file for complete search history.

(56) References Cited

U.S. PATENT DOCUMENTS

| | | | |
|---|---|---|---|
| 9,674,427 | B2 | 6/2017 | Vranceanu |
| 10,311,337 | B1* | 6/2019 | Kim ........................ G06N 3/084 |
| 10,558,848 | B2 | 2/2020 | Rivard et al. |
| 10,594,995 | B2 | 3/2020 | Buffin |
| 10,621,415 | B2 | 4/2020 | Li et al. |
| 11,006,113 | B2* | 5/2021 | Fuchie ..................... H04N 1/41 |
| 11,049,473 | B2* | 6/2021 | Muijs ....................... G09G 5/10 |
| 2011/0181588 | A1* | 7/2011 | Barenbrug ............ G06T 15/205 345/419 |
| 2013/0170540 | A1* | 7/2013 | Damkat ................. H04N 19/154 375/240.01 |
| 2015/0043655 | A1* | 2/2015 | Nilsson ................. H04N 19/124 375/240.26 |
| 2015/0201222 | A1* | 7/2015 | Mertens ............... H04N 19/196 382/233 |
| 2016/0366422 | A1* | 12/2016 | Yin ......................... H04L 43/16 |
| 2017/0078706 | A1* | 3/2017 | Van ........................ H04N 19/46 |
| 2017/0324940 | A1* | 11/2017 | Dutta .................... H04N 1/6086 |
| 2018/0232867 | A1* | 8/2018 | Park ....................... H04N 5/235 |
| 2018/0276801 | A1* | 9/2018 | Stessen .................. H04N 19/98 |
| 2018/0278957 | A1* | 9/2018 | Fracastoro ............ H04N 19/60 |
| 2018/0332286 | A1* | 11/2018 | Pettersson ............. H04N 19/14 |
| 2018/0359416 | A1 | 12/2018 | Hold-Geoffroy et al. |
| 2019/0154442 | A1* | 5/2019 | Annovi ................. G01B 11/303 |
| 2019/0164261 | A1 | 5/2019 | Sunkavalli et al. |
| 2020/0151509 | A1 | 5/2020 | Sunkavalli et al. |
| 2020/0193935 | A1* | 6/2020 | Van De Kerkhof ... G09G 5/026 |
| 2020/0201349 | A1* | 6/2020 | Ha ........................ G05D 1/0088 |
| 2020/0296428 | A1* | 9/2020 | Andrivon .................. G06T 3/40 |
| 2021/0112261 | A1* | 4/2021 | Hwang .................. H04N 19/42 |
| 2021/0160415 | A1* | 5/2021 | Han ...................... H04N 5/2351 |
| 2021/0203901 | A1* | 7/2021 | Hirayama .......... H04N 5/23229 |
| 2021/0374923 | A1* | 12/2021 | Tatae ....................... G06T 5/009 |
| 2021/0383154 | A1* | 12/2021 | Li ........................... G06K 9/6289 |

OTHER PUBLICATIONS

Sun, et al., "Single Image Portrait Relighting," in ACM Trans. Graph., vol. 38, No. 4, Article 79, Jul. 2019, 12 pages.
L. E, et al., "Optimizing Portrait Lighting at Capture-Time Using a 360 Camera as a Light Probe," in UIST '19 Proceedings of the 32nd Annual ACM Symposium on User Interface Software and Technology, Oct. 2019, pp. 221-232.
Calian, et al., "From Faces to Outdoor Light Probes," in Computer Graphics Forum, vol. 37, No. 2, May 2018, 11 pages.
Georgoulis, et al., "Reflectance and Natural Illumination from Single-Material Specular Objects Using Deep Learning," in IEEE Transactions on Pattern Analysis and Machine Intelligence, 40(8), Aug. 2018, 14 pages.
He et al., "Mask R-CNN," arXiv:1703.06870v3 [cs.CV], Jan. 24, 2018, 12 pages.
Hold-Geoffroy, et al., "Deep Sky Modeling for Single Image Outdoor Lighting Estimation," CVF open access reprint of article in 2019 IEEE/CVF Conference on Computer Vision and Pattern Recognition (CVPR), Jun. 2019, 9 pages.
Hold-Geoffroy, et al., "Deep Outdoor Illumination Estimation," CVF open access reprint of article in 2017 IEEE Conference on Computer Vision and Pattern Recognition (CVPR), 2017, 10 pages.
Lalonde, et al., "Estimating Natural Illumination from a Single Outdoor Image," CVF open access reprint of article in 2009 IEEE 12th International Conference on Computer Vision, 2009, 8 pages.
Zhang, et al., "Learning High Dynamic Range from Outdoor Panoramas," CVF open access reprint of article in 2017 IEEE International Conference on Computer Vision (ICCV), 2017, 10 pages.
Nimier-David, et al., "Mitsuba 2: A Retargetable Forward and Inverse Renderer," in ACM Transactions on Graphics, vol. 38, No. 6, Article No. 203, Nov. 2019, 17 pages.
Jakob, Wenzel, "Mitsuba 2: Physically Based Renderer," available at http://www.mitsuba-renderer.org/, accessed on Sep. 6, 2020, 1 page.
Zhang, et al., "All-Weather Deep Outdoor Lighting Estimation," CVF open access reprint of article in 2019 IEEE/CVF Conference on Computer Vision and Pattern Recognition (CVPR), Jun. 2019, 9 pages.
Zhou, et al., "Deep Single-Image Portrait Relighting," CVF reprint of article in 2019 IEEE/CVF International Conference on Computer Vision (ICCV), Jun. 2019, 9 pages.
Iqbal, Haris, "HarisIqbal88/PlotNeuralNet," available at https://github.com/HarisIqbal88/PlotNeuralNet, github, accessed on Sep. 6, 2020, 5 pages.
Debevec, et al., "Recovering High Dynamic Range Radiance Maps from Photographs," in Proceedings of the 24th Annual Conference on Computer Graphics and Interactive Techniques, SIGGRAPH '97, 1997, 10 pages.
Gardner, et al., "Learning to Predict Indoor Illumination from a Single Image," in ACM Transactions on Graphics, vol. 36, Nov. 2017, 14 pages.
Hosek, et al., "An Analytic Model for Full Spectral Sky-dome Radiance," in ACM Transactions on Graphics, Article No. 95, Jul. 2012, 9 pages.
Hosek, et al., "Adding a Solar-Radiance Function to the Hosek-Wilkie Skylight Model," in IEEE Computer Graphics and Applications, 33, 2013, pp. 44-52.
Knorr, et al., "Real-Time Illumination Estimation from Faces for Coherent Rendering," in 2014 IEEE International Symposium on Mixed and Augmented Reality (ISMAR), 2014, 10 pages.
Lalonde, et al., "Lighting Estimation in Outdoor Image Collections," in 2nd International Conference on 3D Vision, 1, 2014, 8 pages.
Li, et al., "Intrinsic Face Image Decomposition with Human Face Priors," in ECCV 2014, Lecture Notes in Computer Science, vol. 8693, 2014, 16 pages.
Liu, et al., "Material Editing Using a Physically Based Rendering Network," CVF reprint of article in 2017 IEEE International Conference on Computer Vision (ICCV), 2017, 9 pages.
Lombardi, et al., "Radiometric Scene Decomposition: Scene Reflectance, Illumination, and Geometry from RGB-D mages," arXiv:1604.01354v1 [cs.CV], Apr. 5, 2016, 16 pages.
Ramamoorthi, et al., "An Efficient Representation for Irradiance Environment Maps," in Proceedings of the 28th Annual Conference on Computer Graphics and Interactive Techniques, Aug. 2001, pp. 497-500.
Ramamoorthi, et al., "A Signal-Processing Framework for Inverse Rendering," in SIGGRAPH '01: Proceedings of the 28th Annual Conference on Computer Graphics and Interactive Techniques, Aug. 2001, pp. 117-128.

(56) References Cited

OTHER PUBLICATIONS

Shim, Hyunjung, "Faces as Light Probes for Relighting," abstract of article in Optical Engineering, 51(7), 2012, available at https://www.spiedigitallibrary.org/journals/Optical-Engineering/volume-51/issue-7/077002/Faces-as-light-probes-for-relighting/10.1117/1.OE.51.7.077002.short?SSO=1, accessed on Sep. 7, 2020,1 page.

Shu, et al., "Neural Face Editing with Intrinsic Image Disentangling," CVF reprint of article in 2017 IEEE Conference an Computer Vision and Pattern Recognition (CVPR), 2017, 10 pages.

Stratou, et al., "Effect of Illumination on Automatic Expression Recognition: A Novel 3D Relightable Facial Database," in Face and Gesture, 2011, 8 pages.

Weber, et la., "Learning to Estimate Indoor Lighting from 3d Objects," arXiv:1806.03994v3 [cs.CV], Aug. 13, 2018, 9 pages.

Otsi, et al., "Real Time Shadow Mapping for Augmented Reality Photorealistic Rendering," in Applied Science, 9, 2225, May 2019, 20 pages.

Ren, et al., "Faster R-CNN: Towards Real-Time Object Detection with Region Proposal Networks," arXiv:1506 01497v3 [cs.CV], Jan. 6, 2016, 14 pages.

Liu, et al., "SSD: Single Shot MultiBox Detector," arXiv:1512.02325v5 [cs.CV], Dec. 29, 2016, 17 pages.

"HarisIqbal88/PlotNeuralNet v1.0.0," accessible from https://zenodo.org/record/2526396#.XxfFmigzZPY, github, Dec. 25, 2018, 3 pages.

Sztrajman, et al., "High-Dynamic-Range Lighting Estimation From Face Portraits," in 2020 International Conference an 3D Vision (3DV), Nov. 2020, pp. 355-363.

Legendre, et al., "DeepLight: Learning Illumination for Unconstrained Mobile Mixed Reality," in SIGGRAPH '19 ACM SIGGRAPH 2019 Talks, Article No. 46, Jul. 2019, 2 pages.

Yi, et al., "Faces as Lighting Probes via Unsupervised Deep Highlight Extraction," available at https://openaccess.thecvf.com/content_ECCV_2018/papers/Renjiao_Yi_Faces_as_Lighting_ECCV_2018_paper.pdf, CVF open access version of paper presented in the European Conference on Comuter Vision (ECCV), 2018, 17 pages.

Zhang, et al., "The Unreasonable Effectiveness of Deep Features as a Perceptual Metric," arXiv:1801.03924v2 [cs.CV], Apr. 10, 2018, 14 pages.

Xu, et al., "IllumiNet: Transferring Illumination from Planar Surfaces to Virtual Objects in Augmented Reality," arXiv e-print, arXiv:2007.05981v1 [cs.CV], Jul. 12, 2020, 10 pages.

PCT Search Report and Written Opinion for PCT/US2021/042264, dated Oct. 28, 2021, 14 pages.

* cited by examiner

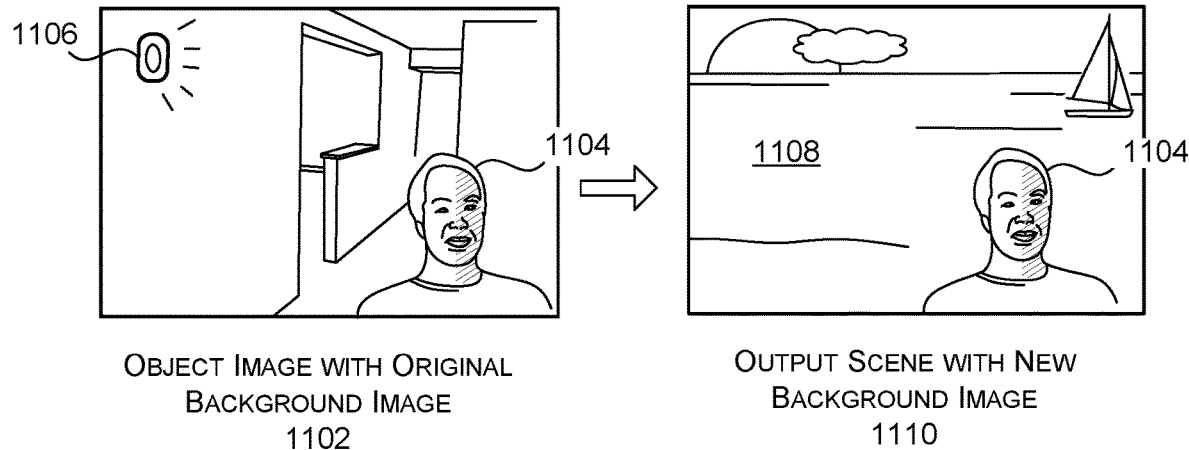

OBJECT IMAGE WITH ORIGINAL
BACKGROUND IMAGE
1102

OUTPUT SCENE WITH NEW
BACKGROUND IMAGE
1110

FIG. 11

OVERVIEW OF THE TRAINING PROCESS 1202

ACCESS A PLURALITY OF PAIRS OF IMAGES IN A TRAINING SET, EACH PAIR OF IMAGES IN THE TRAINING SET INCLUDING AN ENVIRONMENT IMAGE THAT DEPICTS AN ENVIRONMENT, AND AN OBJECT IMAGE THAT SHOWS A REFERENCE OBJECT IN THE ENVIRONMENT THAT IS ILLUMINATED BY ONE OR MORE LIGHT SOURCES WITHIN THE ENVIRONMENT.
1204

IN A FIRST TRAINING TASK, TRAIN AN ENVIRONMENT-ENCODING SYSTEM.
1206

IN A SECOND TRAINING TASK, TRAIN AN OBJECT-ENCODING SYSTEM.
1208

FIG. 12

OVERVIEW OF OPERATION OF AN APPLICATION 1502

RECEIVE A COMBINED ENCODING THAT IS PRODUCED BY TRANSFORMING AN OBJECT IMAGE THAT DEPICTS A REFERENCE OBJECT, THE COMBINED ENCODING REPRESENTING AN ENVIRONMENT IMAGE, THE ENVIRONMENT IMAGE DEPICTING AN ESTIMATE OF AN ENVIRONMENT, HAVING ONE OR MORE LIGHT SOURCES, THAT HAS PRODUCED ILLUMINATION EFFECTS EXHIBITED BY THE REFERENCE OBJECT IN THE OBJECT IMAGE, THE COMBINED ENCODING INCLUDING: A FIRST PART REPRESENTING IMAGE CONTENT IN THE ENVIRONMENT IMAGE THAT EXHIBITS A FIRST RANGE OF INTENSITY LEVELS; AND A SECOND PART THAT REPRESENTS IMAGE CONTENT IN THE ENVIRONMENT IMAGE THAT EXHIBITS A SECOND RANGE OF INTENSITY LEVELS, AT LEAST SOME OF THE INTENSITY LEVELS IN THE FIRST RANGE BEING HIGHER THAN ANY OF THE INTENSITY LEVELS IN THE SECOND RANGE.
1504

CONVERT THE COMBINED ENCODING INTO THE ENVIRONMENT IMAGE.
1506

GENERATE A SCENE BASED, AT LEAST IN PART, ON THE COMBINED ENCODING.
1508

FIG. 15

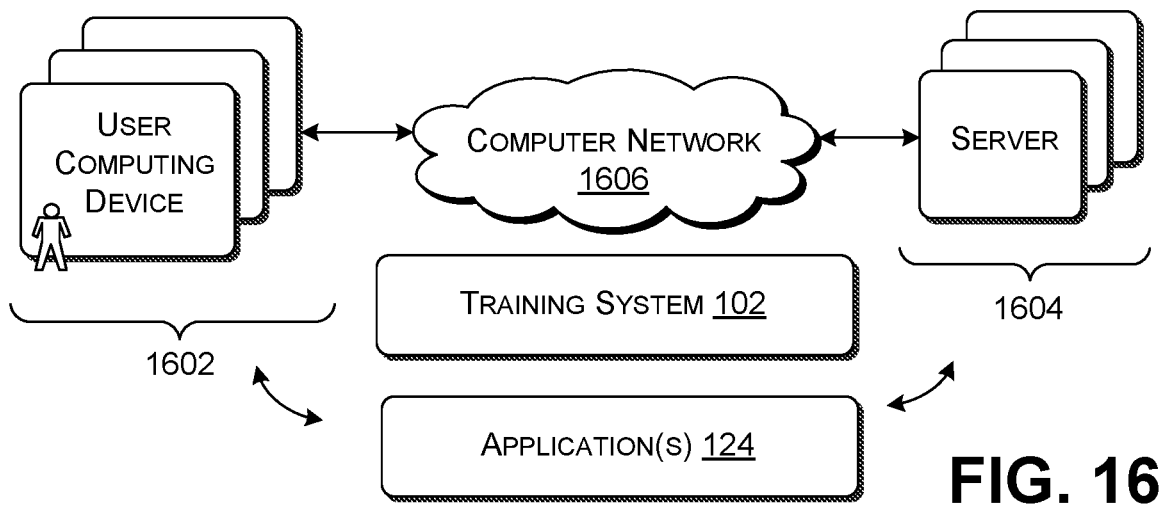

FIG. 16

ESTIMATING ILLUMINATION IN AN ENVIRONMENT BASED ON AN IMAGE OF A REFERENCE OBJECT

BACKGROUND

The technical literature describes attempts to estimate the characteristics of illumination within an environment by analyzing an image of an object that appears in the environment. These systems may face at least two technical challenges. First, some systems may fail to identify the characteristics of the illumination with sufficient accuracy, particularly with respect to outdoor scenes characterized by a high dynamic range of light intensity levels. Second, some systems may involve complex image processing. This factor challenges the ability of these systems to perform real-time inference-stage processing.

SUMMARY

Technology is described herein that uses an object-encoding system to convert an object image into a combined encoding. The object image depicts a reference object (such as a face of a human subject), while the combined encoding represents an environment image. The environment image, in turn, models an environment, having one or more light sources, that has illuminated the reference object that appears in the object image. The combined encoding is a compact and expressive data structure that includes: a first part that represents image content in the environment image within a first range of intensity values; and a second part that represents image content within a second range of intensity values. The first range includes at least some intensity values that are higher than any of the intensity values in the second range.

In at least one non-limiting case, the environment image has a wider range of intensity levels compared to the object image. For example, the environment image that is represented by the combined encoding has intensity values that are permitted to range over the above-noted first and second ranges of intensity values, while the object image has intensity values that are permitted to range over just the second range of intensity values.

According to another illustrative aspect, one or more applications can make use of the combined encodings produced by the technology. A first application leverages the combined encoding to apply appropriate illumination to a virtual object that is inserted into an augmented-reality environment. As used herein, an augmented-reality environment refers to any computer-generated environment that combines a representation of a physical object in a user's current physical environment with a virtual object which does not have a physical counterpart in the current physical environment. A second application leverages a combined encoding to choose an appropriate background image for a video conference presentation.

According to another illustrative aspect, the technology includes a training system that first trains an environment-encoding system. The environment-encoding system converts environment images into respective combined encodings. For at least some environment images in this context, each environment image may represent an image of a physical environment that illuminates a reference object, as produced, for example, by a camera that is capable of capturing image content over a relatively wide range of light intensities. The environment-encoding system operates by breaking each environment image into a first image that includes high-intensity image content and a second image that includes low-intensity image content, and then separately encoding these two images to produce the respective first and second parts of a combined encoding.

According to another illustrative aspect, the training system adjusts the object-encoding system such that combined encodings that it produces match the combined encodings produced by the environment-encoding system, given a plurality of pairs of object images and environment images.

According to one technical advantage, the technology described herein generates an encoding that represents illumination within an environment image in an accurate manner. The technology specifically achieves high accuracy by separately modeling the high-intensity part of the environment image. This is because, as recognized by the inventors, the high-intensity part of the environment image plays a significant role in the illumination effects exhibited by the environment image, and therefore it is useful to preserve this part with high fidelity in a manner that is not compromised by the technology's encoding of the low-intensity part (and vice versa). The technology also provides machine-trained models that are sufficiently streamlined to be applied by an application in a real-time manner.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 shows an example of the operation of the background insertion application of FIG. 10.

FIG. 12 shows a process that represents one manner of operation of the training system of FIG. 1.

FIG. 15 shows a process that represents one manner of operation of an application that makes use of one or more systems trained by the training system of FIG. 1.

FIG. 16 shows an example of computing equipment that can be used to implement any of the systems summarized above.

Figure 1:
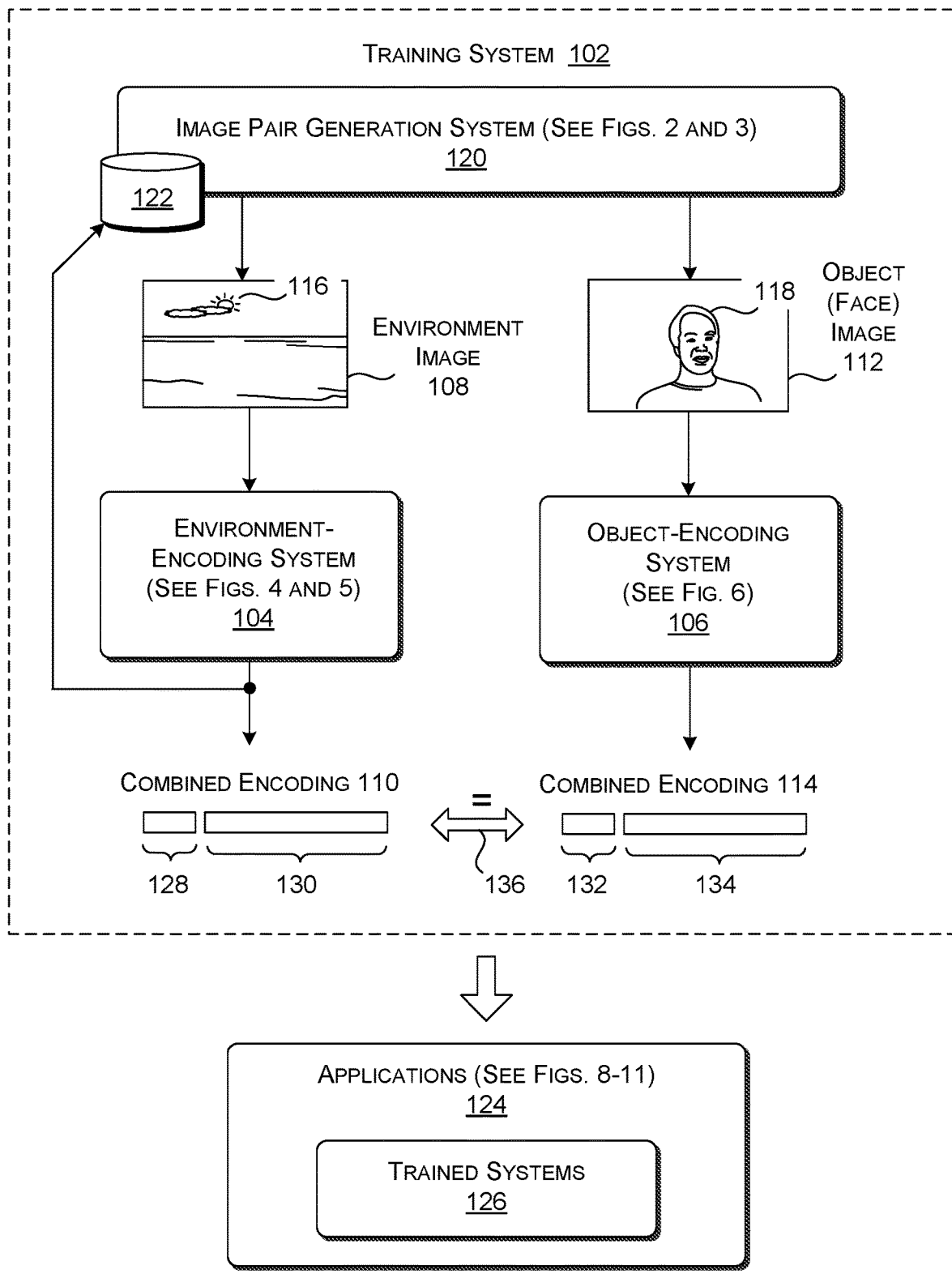
FIG. 1 shows a training system for training an environment-encoding system and an object-encoding system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes systems for image processing. Section B sets forth illustrative methods which explain the operation of the systems of Section A. And Section C describes illustrative computing hardware that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "module," "engine," "system," and "tool" refers to a part of the hardware logic circuitry that performs a particular function or combination of functions.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Systems

A.1. Training System

FIG. 1 shows a training system 102 for training an environment-encoding system 104 and an object-encoding system 106. The environment-encoding system 104 maps an environment image (e.g., environment image 108) into a combined encoding 110. The object-encoding system 106 maps an object image (e.g., object image 112) into another combined encoding 114.

An environment image refers to a digital image or map of an environment. The environment includes or otherwise exhibits the effects of one or more illumination sources. For example, the illustrative environment image 108 depicts an outdoor scene that includes the sun 116 as a principal light source. An object image refers to an image that contains at least one reference object. The reference object, in turn, is lit up by the light source(s) in the environment that is depicted by a corresponding environment image. For example, the illustrative object image 112 includes a reference object that prominently features the face 118 of a human subject. The face 118 of the human subject shows illumination effects that are caused by the light that impinges on the human subject within the environment captured by the environment image 108. The environment image 108 and the object image 112 form a related pair of images due to the nexus described above.

An image pair generation system 120 produces a plurality of pairs of images, such as the illustrative pair of images (108, 112) summarized above. The image pair generation system 120 stores the pairs of images in a data store 122. The operation of the image pair generation system 120 will be described below in greater detail. By way of introduction, in one case, an operator uses a digital camera to capture the environment image 108 from a particular vantage point in a physical environment. A human subject is then asked to stand at the same vantage point. The operator then uses the camera to capture the object image 112 that shows the subject's face illuminated by the sun 116.

From a high-level perspective, the goal of the technology set forth herein is to use the object-encoding system 106 to indirectly discover the illumination-related characteristics of an environment that is represented by the environment image 108 on the basis of evidence imparted by the object image 112. In this sense, the object-encoding system 106 can be said to estimate or model the environment based on information extracted from the object image 112. The technology then uses the knowledge it has gained in various application-specific ways. For example, the technology can use knowledge of the illumination effects in the environment to compose an augmented-reality scene in which the human subject and a virtual object are illuminated in a consistent manner.

This subsection (Subsection A.1) summarizes the operation of the training system 102. Subsection A.2 describes the operation of the environment-encoding system 104 in greater detail. Subsection A.3 describes the operation of the object-encoding system 106 in greater detail. And Subsection A.4 describes the operation of various applications 124, each of which includes one or more trained systems 126 produced by the training system 102.

To begin with, the combined encoding 110 produced by the environment-encoding system 104 is a data structure that includes two parts (128, 130), which can be expressed as a vector. The combined encoding 114 produced by the object-encoding system 106 is likewise a data structure that includes two parts (132, 134), which can be expressed as a vector. The second part of each combined encoding describes a portion of an environment image that is characterized by a low range of intensity levels. The first part of each combined encoding describes a portion of the environment image that is characterized by a high range of intensity levels. In one non-limiting example, the second part is mainly devoted to pixels within an environment image having intensity levels ranging from a lower-bound value $L_{b1}$ (e.g., zero) to some upper-limit value $L_{b2}$, inclusive of $L_{b1}$ and $L_{b2}$. The first part is mainly devoted to pixels in the environment image having values above the upper-limit value $L_{b2}$. More generally, the "intensity" of a scene element refers to an amount of light exhibited by that scene element, and the intensity of a pixel represents an amount of light represented by the pixel, which can be represented as a grayscale value. A range of intensity values can be represented as a range of numerical values associated with pixels.

In the example of FIG. 1, the first part 128 of the combined encoding 110 can predominantly represent those pixels in the environment image 108 that describe the sun 116. In computing the first part 128, the environment-encoding system 104 effectively omits any pixels in the environment image 108 in the lower-intensity range. In computing the second part 130, the environment-encoding system 104 clips those pixels in the environment image 108 that are above the prescribed upper-limit value $L_{b2}$ to the value of $L_{b2}$.

Stated in more general terms, the first part 128 can be said to represent a first range of intensity values, and the second part 130 can be said to represent a second range of intensity values. The first range of intensity values has at least some intensity values that are not included in the second range of intensity values, and are higher (more intense) than any of the intensity values in the second range of intensity values. In the non-limiting example described above, the first range immediately follows the second range in a continuum of intensity levels from low to high. But other implementations can define what constitutes a first range and second range in other ways. For example, in another case, the first range and the second range can describe overlapping intensity ranges. In addition, or alternatively, a gap of intensity levels can separate the first range and the second range. In addition, or alternatively, the first range and/or the second range can each represent a composite of plural sub-ranges, with gaps between neighboring sub-ranges.

The object-encoding system 106 maps the object image 112 into the combined encoding 114 without directly acting on an environment image. But the combined encoding 114 produced thereby can be said to provide an estimate of a physical or virtual environment that has produced the illumination effects exhibited in the object image 112. For example, in the case of FIG. 1, the illumination effects shown in the object image 112 are actually produced by the environment depicted in the environment image 108. This means that the combined encoding 114 produced by a properly trained object-encoding system 106 will produce a computer-generated estimate of the actual environment image 108 on the basis of the object image 112 alone.

In one implementation, the environment image 108 has intensity values that are permitted to range across a more encompassing range of intensity levels compared to the object image 112. In other words, the environment image 108 has a higher dynamic range than the object image 112. For example, the object image 112 may include intensity levels that are permitted to range within the second range. In contrast, in one non-limiting case, the environment image 108 includes intensity levels that are permitted to range over both the second range and the first range. Note that a physical environment has illumination characteristics that naturally span a relatively large range of intensity values. Each combined encoding describes an environment image that also has a wide range of intensity levels. Thus, each combined encoding can provide a faithful representation of an environment.

In one implementation, the training system 102 performs training in three phases. First, the image pair generation system 120 produces a plurality of image pairs, such as the illustrative pair that includes the environment image 108 and the illustrative object image 112. Second, the training system 102 trains an auto-encoder (not shown) used by the environment-encoding system 104, described in greater detail in Subsection A.2. The auto-encoder includes an environment encoder and an environment decoder that operate in series. The environment encoder converts an environment image into an intermediary encoding, while the environment decoder converts the intermediary encoding back into the original environment image. The intermediary encoding serves as the second part of the combined encoding for the environment image. Third, the training system 102 trains a machine-trained object encoder (not shown) used in the object-encoding system 106, described in greater detail in Subsection A.3.

In performing the second phase, the training system 102 trains the auto-encoder used by the environment-encoding system 104 based on a set of environment images provided in the data store 122. More specifically, the training system 102 iteratively adjusts the parameter values of the autoencoder such that its environment encoder can convert an environment image to the intermediary representation, and then its environment decoder can accurately restore the environment image from the intermediary representation. In performing the third phase of training, the training system 102 iteratively adjusts the parameter values of the object encoder used by the object-encoding system 106 such that the combined encodings produced by the object-encoding system 106 match corresponding combined encodings produced by the environment-encoding system 104. For example, the training system 102 attempts to adjust the parameter values of the object-encoding system 106 such that the combined encoding 114 produced by the object-encoding system 106 for the environment image 108 matches the combined encoding 110 produced by the environment-encoding system 104 for the object image 112. The double-headed arrow 136 shown in FIG. 1 represents this principle.

The training system 102 can use any objective function(s) to perform the above training tasks. In one non-limiting case, the training system 102 uses a Mean Square Error (MSE) loss function to train the environment-encoding system 104. The training system 102 can also apply different scaling factors in computing different parts of the combined encoding 110, such as a first scaling factor when computing the second (low) part 130, and one or more other scaling factors when computing different values of the first (high) part 128. The training system 102 can also apply various constraints when computing the high part 128 of the combined encoding 110. For example, assume that the high part 128 includes at least one value that describes an azimuth angle of the sun's position. The training system 102 can impose a constraint that ensures periodicity in the azimuth angle. This constraint is useful in interpreting environment images in which the sun is located close to the edge of the environment image. In one non-limiting case, the training system 102 uses a Mean Absolute Error (MAE) loss function to train the object-encoding system 106. The training system 102 can use any training technique to train its models based on the above loss functions, such as stochastic gradient descent.

Figure 2:
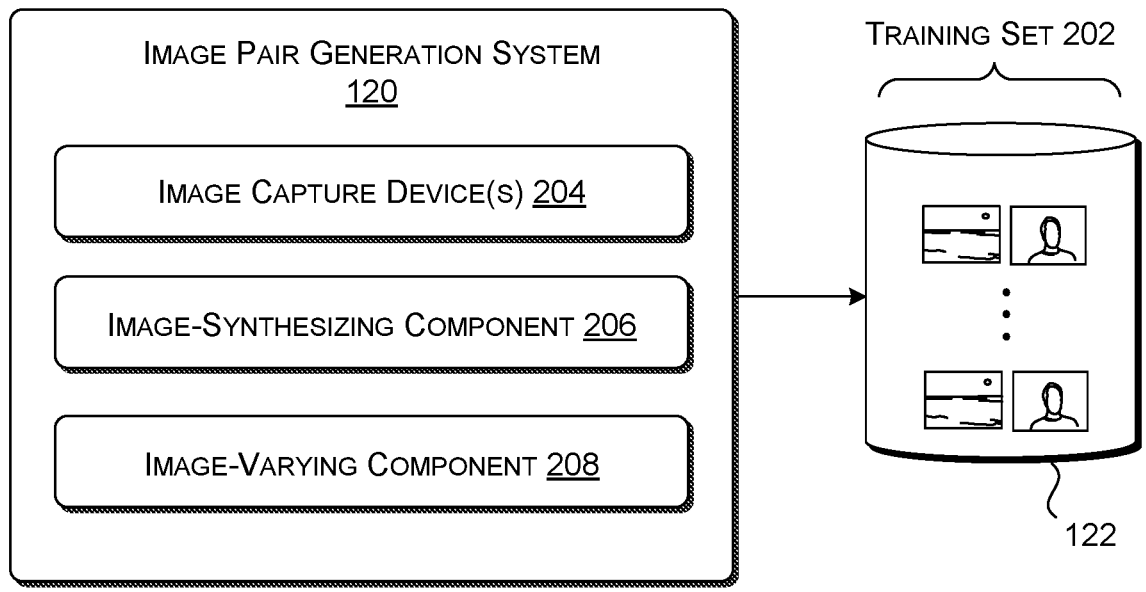
FIG. 2 shows an image pair generation system for producing a corpus of image pairs, for use within the training system of FIG. 1.

FIG. 2 shows the image pair generation system 120 introduced in FIG. 1. The image pair generation system 120 produces a plurality of pairs of images, and stores the pairs in the data store 122. Each pair of images includes an environment image and an object image. As explained above, the environment image shows an environment that includes or otherwise exhibits the effects of one or more light sources (such as the sun). The object image shows a reference object (e.g., a face) that appears in the environment that is depicted in a counterpart environment image. The plurality of pairs collectively constitutes a training set 202.

The image pair generation system 120 includes a set of devices and/or software modules for producing the training set 202. For instance, the image pair generation system 120 provides one or more image capture devices 204 that enable an operator to capture the images. The image capture device(s) 204 can include any cameras for capturing still images, any video cameras for capturing video, etc. In one non-limiting case, the image capture device(s) can use a first camera (or first camera mode) to capture environment images, and a second camera (or second camera mode) to capture object images. The first camera (or camera mode) is capable of capturing image content having a greater range of intensity levels than the second camera (or camera mode). In the terminology used in the industry, the first camera may correspond to a High Dynamic Range (HDR) camera, and the second camera may correspond to a Low Dynamic Range (LDR) camera. Other implementations can adopt additional camera-related technology, such as including camera technology that can capture a depth image, a panoramic image, an infrared image, etc.

Figure 3:
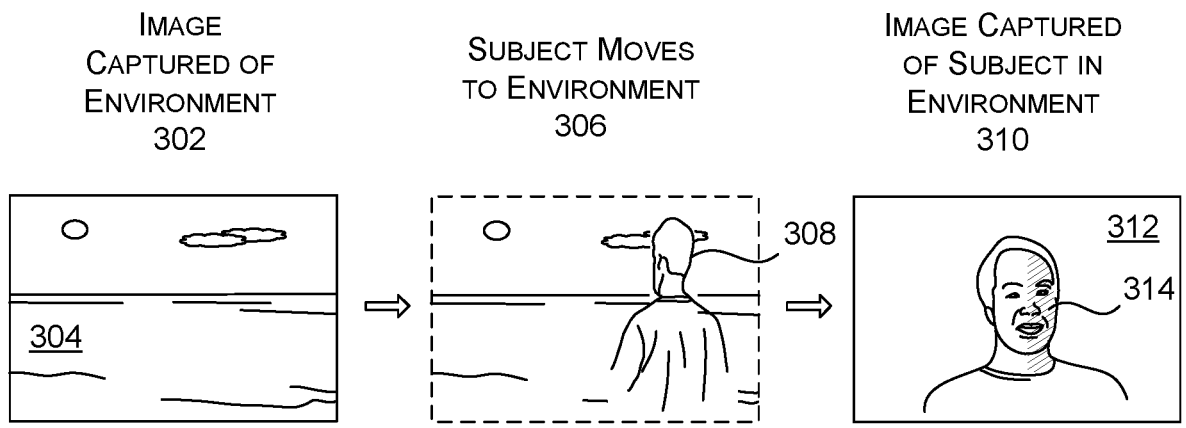
FIG. 3 shows a sequence of steps involved in capturing a pair of images using the image pair generation system of FIG. 2.

Jumping ahead momentary in the series of figures, FIG. 3 shows a sequence of steps that an operator may perform to capture a pair of images. At a first step 302, the operator takes a picture of an environment at a particular location and vantage point within the environment. This yields an environment image 304. In a second step 306, the operator asks a human subject 308 to move to the same position in the environment at which the environment image 304 was taken. In a third step 310, the operator captures an object image 312 of the human subject 308. The object image 312 shows illumination effects (here, shadows 314) produced by the sun in the environment. Note that this disclosure emphasizes the case in which the reference object corresponds to a human subject. But the principles described herein can be practiced for any other reference object. For example, in other case, the reference object may correspond to a three-dimensional figurine having any prescribed shape. Further, this disclosure includes several examples in which the environment is an outdoor environment. But the techniques set forth herein apply to any type of environment that is characterized by a relatively wide range of light intensities, including an indoor environment, a mixed indoor/outdoor environment, etc.

Returning to FIG. 2, the image pair generation system 120 can alternatively, or in addition, use an image-synthesizing component 206 to artificially create pairs of images. For example, the image-synthesizing component 206 can use any rendering pipeline to render a three-dimensional model at various perspectives and postures, to thereby create various object images. The rendering pipeline can apply illumination to each object image in various ways, e.g., based on a real environment image (captured by a camera) or a synthesized environment image. Each combination of a synthesized object image and a real or synthesized object image constitutes an image pair.

The image pair generation system 120 can also provide an image-varying component 208 that can modify any attribute(s) of the images captured by the image capture device(s) 204 and/or the image-synthesizing component 206. For example, the image-varying component 208 can horizontally flip images in a pair of images to create a new pair of images. The image-varying component can also change the color, intensity levels, scale, etc. of any of the images and/or any of the individual objects that appear in the images.

A.2. The Environment-Encoding System

Figure 4:
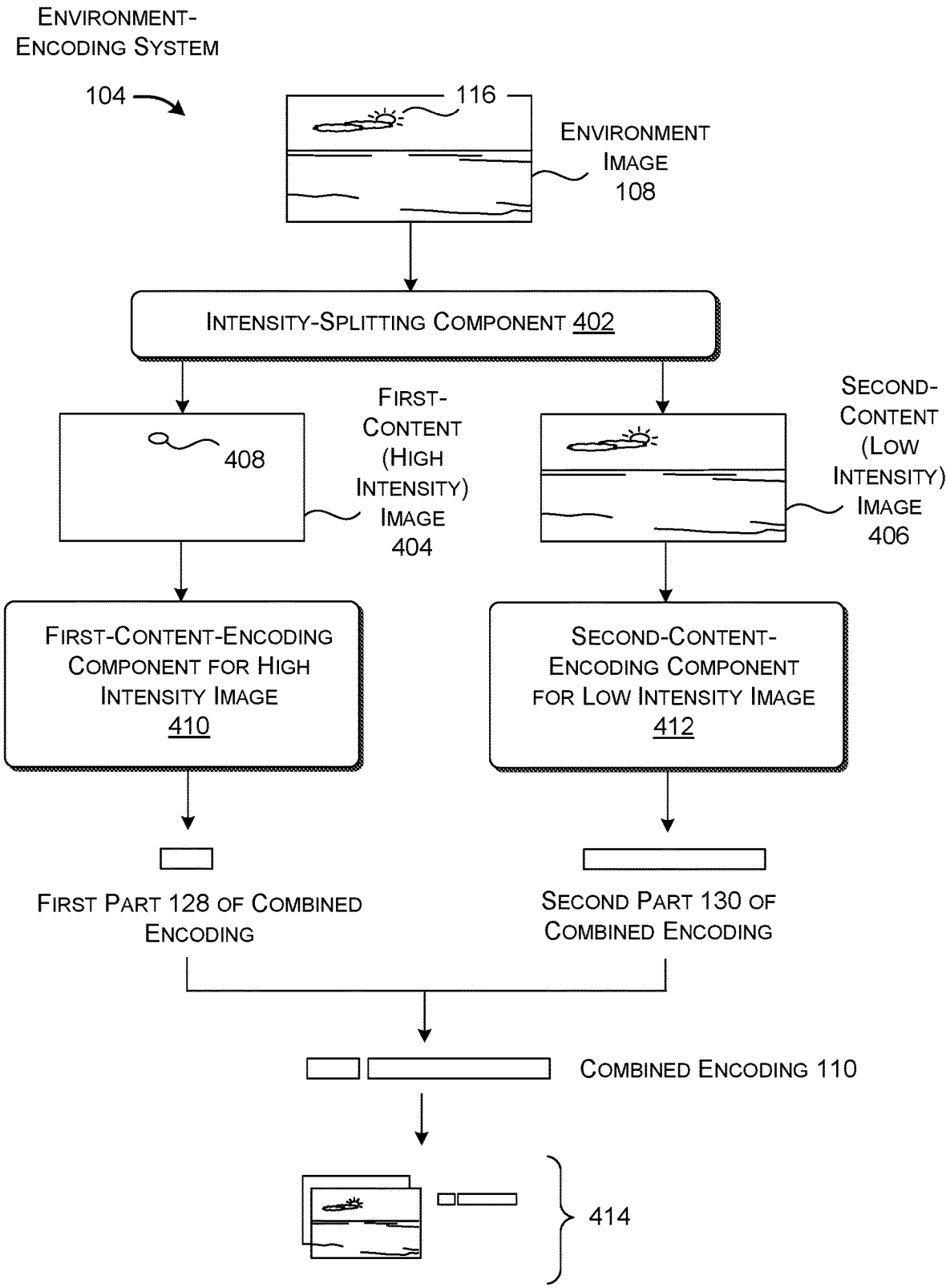
FIG. 4 shows one implementation of the environment-encoding system trained by the training system of FIG. 1.

FIG. 4 shows one implementation of the environment-encoding system 104 introduced in Subsection A.1. In one implementation, the environment-encoding system 104 includes an intensity-splitting component 402 that processes an input environment image 108 to produce a first-content image 404 and a second-content image 406. The first-content image 404 emphasizes that portion of the input environment image 108 having intensity values above a prescribed intensity threshold value $L_{b2}$, while the second-content image 406 emphasizes that portion of the input environment image 108 having intensity values equal to or lower than the intensity threshold value $L_{b2}$. To repeat, other implementations can adopt other interpretations as to what constitutes a first intensity range and a second intensity range.

More specifically, in one non-limiting implementation, the intensity-splitting component 402 produces pixels in the second-content image 406 having intensity values given by $L_{low}=\text{clip}(L, L_{b1}, L_{b2})$; this means that the intensity-splitting component 402 sets intensity value $L_{low}$ to the original (given) intensity value L within the range of $L_{b1}$ (e.g., 0) to $L_{b2}$ inclusive of $L_{b1}$ and $L_{b2}$. The intensity-splitting component 402 clips the intensity of $L_{low}$ at $L_{b2}$ for those original intensity values L greater than $L_{b2}$. For example, the intensity-splitting component 402 may set the intensity values of pixels that represent the sun to $L_{b2}$. The intensity-splitting component 402 produces pixels in the first-content image 404 having intensity values given by $L_{high}=L-L_{low}$ for those pixels for which $L>L_{low}$, and zero otherwise.

A first-content-encoding component 410 maps the first-content image 404 to the first part 128 of the combined encoding 110. A second-content-encoding component 412 maps the second-content image 406 to the second part 130 of the combined encoding 110. The concatenation of the first part 128 and the second part 130 together form the combined encoding 110 associated with the particular environment image 108. Recall that the environment image 108, in turn, is also associated with a particular object image 112 (not shown in FIG. 4). The bottom of FIG. 3 shows a set 414 that represents these three items: that is, the environment image 108; the combined encoding 110; and the object image 112.

The first-content-encoding component 410 can be implemented in different ways. In a first approach, the first-content-encoding component 410 uses any type of data-fitting algorithm to fit a representation to the cluster of values that make up the first-content image 404. For example, without limitation, the first-content-encoding component 410 can use the Levenberg-Marquardt algorithm to fit a Gaussian Mixture Model (GMM) to the data points in the first-content image 404. More specifically, the first-content-encoding component 410 can fit a two-dimensional GMM to each color channel of the values in the first-content image 404, initializing its processing using the maximum RGB values in the environment image 108. These color-specific GMMs should have the same center position, which marks the highest intensity value for all of the color channels.

The first-content-encoding component 410 produces the first part 128 of the combined encoding 110 as a set of values that describe the above-identified GMMs. For example, without limitation, the first-content-encoding component 410 can represent the GMMs using five values. The first two values describe the position of the center of the GMMs while the remaining three values describe the intensity of each color channel. The first-content-encoding component 410 can represent the position of the Gaussian center using any positioning system, such as by providing x and y coordinates of the center, providing azimuth and zenith angles, etc. In one non-limiting implementation, the first-content-encoding component 410 can set the covariance of the GMMs to a fixed value.

The use of a Gaussian representation is set forth above in the spirit of illustration, not limitation. In other implementation, the first-content-encoding component 410 can use an oval or other geometric shape to describe the outer perimeter of a cluster of high-intensity values that appear in the first-content image 404. In another implementation, the first-content-encoding component can using a neural network of any type (such as a Convolutional Neural Network (CNN)) to map the values in the first-content image 404 to the first part 128 of the combined encoding 110, and so on.

In other examples, an environment may be characterized by two or more high-intensity zones, such as a two street lights on a darkened street, or the sun and the sun's reflection on a lake or window pane, etc. Here, the first-content-encoding component 410 can use separate representations (e.g., separate GMMs or other data models) to describe the separate respective light sources, and/or it can use a single representation to describe all of the light sources.

Figure 5:
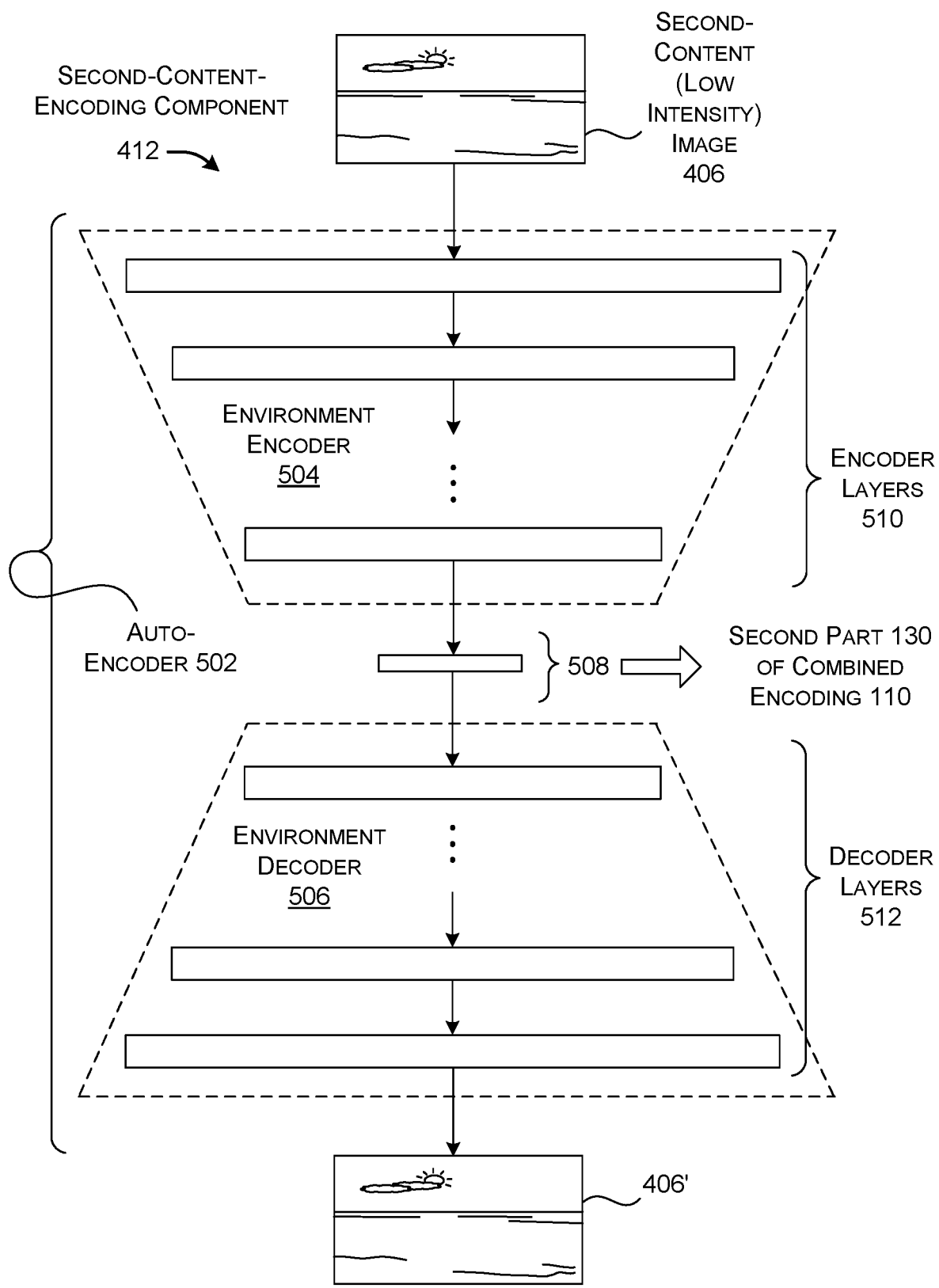
FIG. 5 shows an auto-encoder for use in the environment-encoding system of FIG. 4.

Advancing to FIG. 5, this figure shows one implementation of the second-content-encoding component 412. The second-content-encoding component 412 correspond to an auto-encoder 502 having an environment encoder 504 and an environment decoder 506. The environment encoder 504 maps the second-content image 406 to an intermediary representation 508 of the second-content image 406. The environment decoder 504 maps the intermediary representation 508 to a version 406' of the original second-content image 406. The objective of the training system 102 is to produce parameter values for the auto-encoder 502 such that the version 406' it produces closely matches the original second-content image 406. In other words, the objective of the training system 102 is to train the auto-encoder 502 such that it does a good job in restoring the second-content image 406 to its original appearance, after having reducing it to the intermediary representation 508. To perform this task well, the auto-encoder must also produce an intermediary representation 508 that does a good job representing the second-content image 406.

The intermediary representation 508 produced by the environment encoder 504 serves as the second part 130 of the combined encoding 110. In one merely illustrative implementation, the second part 130 is a vector having a dimensionality of 16 values. The resultant combined encoding 110 represents the concatenation of the first part 128 and the second part 130. In one merely illustrative implementation, the combined encoding 110 has 21 values, including 5 values that describe the first-content image 404 and 16 values that describe the second-content image 406.

In one case, the environment encoder 504 can be implemented as a CNN including any number of encoder layers 510. The layers 510 can include any combination and intermixture of convolutional layers, pooling layers, activation functions (e.g., ReLU operations), fully-connected layers, etc. The downward-tapering shape of the environment encoder 504 indicates that it successively reduces the dimensionality of the information it processes, starting with the second-content image 406 and ending with the intermediary representation having 16 values.

Likewise, the environment decoder 506 can be implemented as a CNN having any number of decoder layers 512. The layers 512 can include any combination and intermixture of convolutional layers, up-sampling layers, activation functions, fully-connected layers, etc. The downward-flaring shape of the environment decoder 506 indicates that it successively expands the dimensionality of the information it processes, starting with the intermediary representation 508 and ending with the version 406' of the second-content image 406.

Other implementations can use other machine-trained models or other algorithms to implement the second-content-encoding component 412. For example, another implementation can use a generative model to implement the second-content-encoding component 412. The generative model can be trained using a Generative Adversarial Network (GAN).

A.3. The Object-Encoding System

Figure 6:
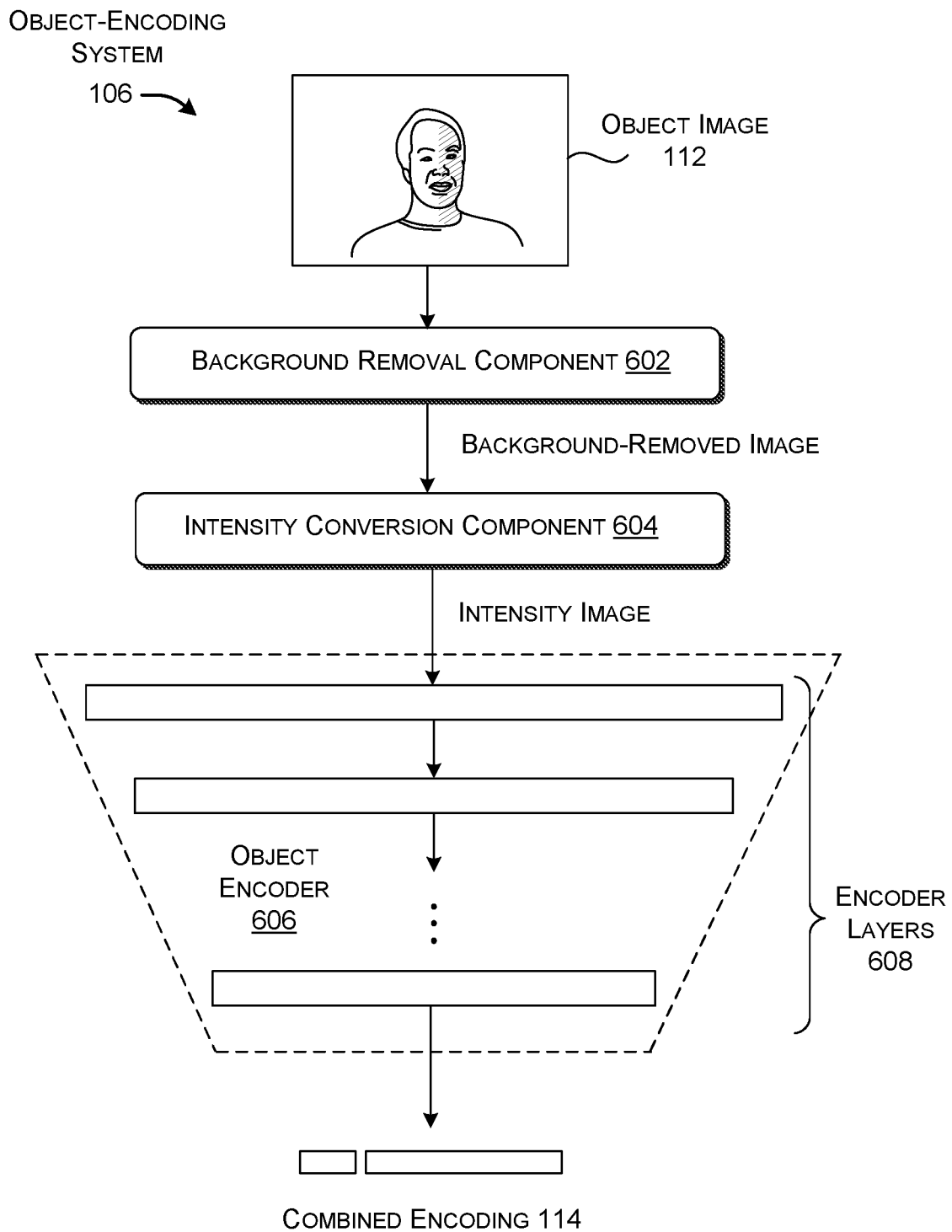
FIG. 6 shows one implementation of the object-encoding system trained by the training system of FIG. 1.

FIG. 6 shows one example of the object-encoding system 106 introduced in the Subsection A.1. Recall that the purpose of the object-encoding system 106 is to convert an object image 112 into the combined encoding 114. In one implementation, the object-encoding system 106 is implemented as a pipeline that performs a series of operations. A background removal component 602 first identifies the reference object in the object image 112 and removes all background content in the object image 112 that does not form part of the reference object. This process produces a background-removed image. In this example, the reference object is a face of a human subject.

The background removal component 602 can use any segmentation technique to perform this task. For example, the background removal component 602 can identify candidate regions in the object image 112, and then use a machine-trained model to classify the content in the candidate regions. In the example of FIG. 6, the background removal component 602 can extract the region(s) (if any) that it classifies as a human face. Background information regarding the general topic of image segmentation can be found in the following articles: He, et al., "Mask-CNN," arXiv:1703.06870v3 [cs.CV], Jan. 24, 2018, 12 pages; Ren, et al., "Faster R-CNN: Towards Real-Time Object Detection with Region Proposal Networks," arXiv:1506.01497v3 [cs.CV], Jan. 6, 2016, 14 pages; and Liu, et al., "SSD: Single Shot MultiBox Detector," arXiv:1512.02325v5 [cs.CV], Dec. 29, 2016, 17 pages. The background removal component 602 can use any of these techniques to identify the reference object in the object image 112, or other techniques.

An intensity conversion component 604 converts the RGB values (or other kinds of color values) in the background-removed image into intensity values, representing the intensity of light over the background-removed image. This produces an intensity image that expresses intensity values over the object image 112. In one non-limiting implementation, the intensity conversion can produce a luminance value Y of a pixel based on a linear combination of its red (R), green (G), and blue (B) components, e.g., $Y=0.2126R+0.7152G+0.0722B$.

An object encoder 606 then maps the intensity image into the combined encoding 114. In one implementation, the object encoder 606 can be implemented as a CNN that includes any number of encoder layers 608. The layers 608 can include, for example, any combination and intermixture of convolutional layers, pooling layers, activation functions, fully-connected layers, etc. The downward-tapering shape of the object encoder 606 indicates that it successively reduces the dimensionality of the information it processes, starting with the intensity image and ending with the combined encoding having 21 values.

More specifically, the first five values of the combined encoding 114 describe the high-intensity portion of a hypothesized environment image that could have produced the illumination effects shown in the object image 112. The next 16 values of the combined encoding 114 describe the low-intensity portion of the hypothesized environment image. However, note that the object encoder 606 does not devote separate functionality for generating these separate parts of the combined encoding 114. Further note that, when applied in the inference stage, the object-encoding system 106 processes an object image for which there may be no actual preexisting environment image that has been previously captured by a camera. This is why the combined encoding 114 is said to refer to as a "hypothesized," "estimated," or "modeled" environment image.

Again, the details provided in this subsection are presented in the spirit of illustration, not limitation. Other implementations can vary the type of components used in the pipeline shown in FIG. 6 and/or the order of the components in the pipeline. For example, another implementation can use a generative model trained by a GAN instead of the CNN-implemented object encoder 606 shown in FIG. 6.

A.4. Illustrative Applications

Figure 7:
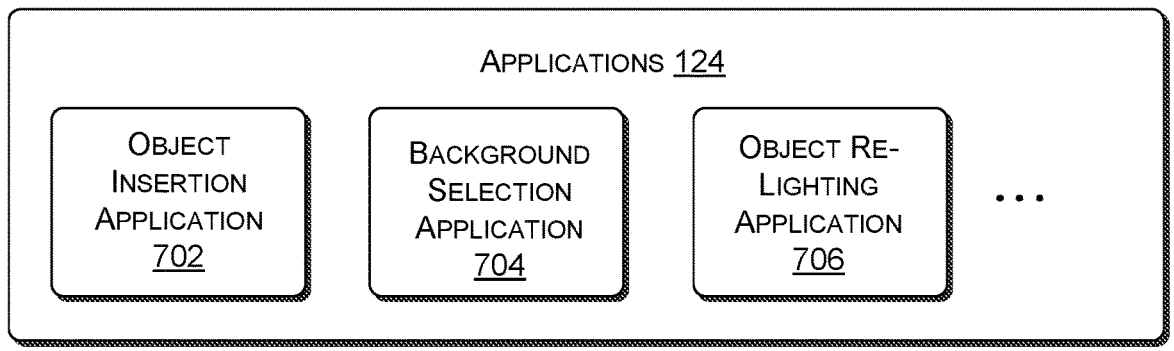
FIG. 7 shows a set of applications that can make use one or more systems produced by the training system of FIG. 1.

FIG. 7 shows a set of applications 124 that can make use of combined encodings produced the object-encoding system 106 of FIG. 6. Each application can use one or more components produced by the training system 102 described in Subsection A.1, depending on the particular functions performed by the application. For example, some applications can make use of the trained object-encoding system 106. The object-encoding system 106 converts an object image to a combined encoding. In addition, or alternatively, some application can make use of the trained environment-encoding system 104, or part thereof, such as the environment decoder 506 shown in FIG. 5. The environment decoder 506 maps a combined encoding to an environment image.

Without limitation, FIG. 7 shows three illustrative applications: an object insertion application 702, a background selection application 704, and an object relighting application 706. The object insertion application 702 uses one or more components produced by the training system 102 to insert a properly-lit virtual object into an augmented-reality scene. The background selection application 704 uses one or more components produced by the training system 102 to choose an appropriate background image for inclusion in a presented scene. The object relighting application 706 uses one or more components produced by the training system 102 to modify the original illumination in an image.

Figure 8:
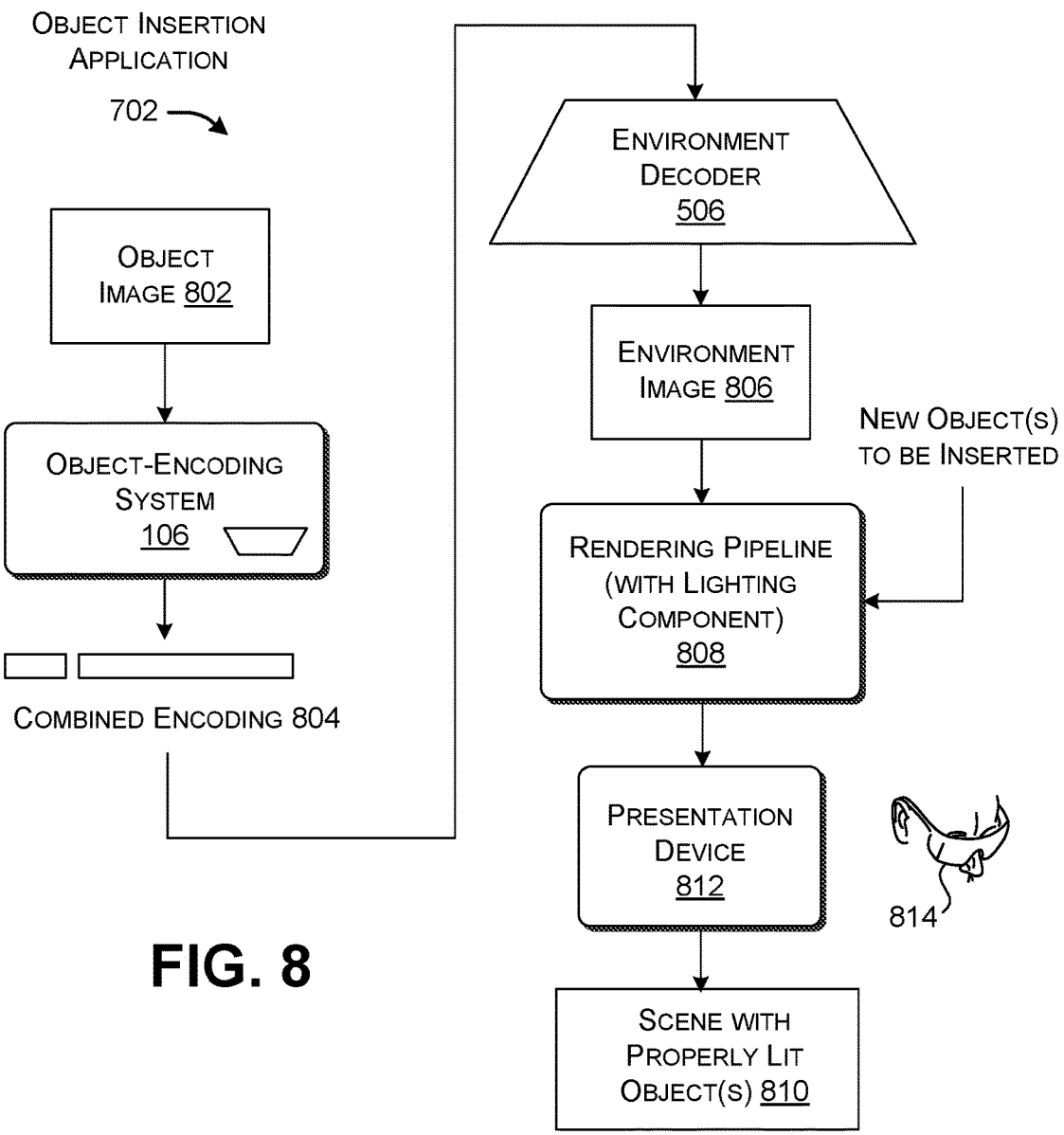
FIG. 8 shows one implementation of an object insertion application.

FIG. 8 shows an example of the object insertion application 702. Here, the trained object-encoding system 106 receives an object image 802. The object image 802 includes some reference object to be included in an augmented-reality scene. For example, the reference object may correspond to any kind of animate or inanimate object that appears in an actual physical environment. Assume that one or more light sources light up the reference object in the physical environment in a particular way, as evidenced by illumination effects exhibited by the object image 802.

The object-encoding system 106 maps the object image 802 into a combined encoding 804 in the manner described in Subsection A.3. The combined encoding 804 describes a hypothesized or estimated environment image. As previously explained, this environment image estimates the physical environment that produced the illumination effects manifested in the object image 802. The combined encoding 804 includes a first part and a second part. The first part characterizes a high-intensity portion of the hypothesized environment image, while the second part characterizes the low-intensity portion of the hypothesized environment image. The trained environment decoder 506 next converts the combined encoding into an environment image 806, which depicts the actual hypothesized environment image.

A rendering pipeline 808 creates a scene 810 that includes the reference object depicted in the object image 802 and at least one virtual object. For example, the virtual object may correspond to a computer-generated character or a representation of an actual object, neither of which actually appears in the physical environment at the present time. The rendering pipeline 808 includes an illumination stage that applies illumination effects to the reference object and the virtual object based on light sources exhibited by the environment image 806. The rendering pipeline 808 can produce these effects in any manner. For example, the rendering pipeline 808 can identify an extent to which a surface element of an object faces a light source, which, in turn, can be determined by an extent to which a normal to the surface element diverges from a line connecting the surface element to the light source. The rendering pipeline 808 can then apply shading to the surface element based on this determination. Background information on the general topic of renderers can be found, for example, in Merlin Nimier-David, et al., "Mitsuba 2: A Retargetable Forward and Inverse Renderer," in ACM Transactions on Graphics, Vol. 38, No. 6, Article No. 203, November 2019, 17 pages A presentation device 812 presents the scene 810 generated by the rendering pipeline 808. In one implementation, the presentation device 812 is an augmented-reality device of any type. For example, the augmented-reality device may correspond to a head-mounted display (HMD) device 814 that uses a see-through display mechanism or a non-see-through display mechanism to present the scene 810. In another implementation, the presentation device 812 is a two-dimensional display device, such as a smartphone display device, a computer monitor, etc. The augmented-reality device is generally characterized as an "augmented reality" device because it creates a scene that combines at least one object that is physically present in a real physical environment with at least one other object that is not currently present in the physical environment. Overall, the object insertion application 702 leverages the object-encoding system 106 and the environment decoder 506 to apply illumination effects in the scene 810 in a consistent manner, e.g., such that the reference object and the virtual object cast shadows in a consistent manner. This improves the naturalness of the scene 810 that is presented to a viewer.

Figure 9:
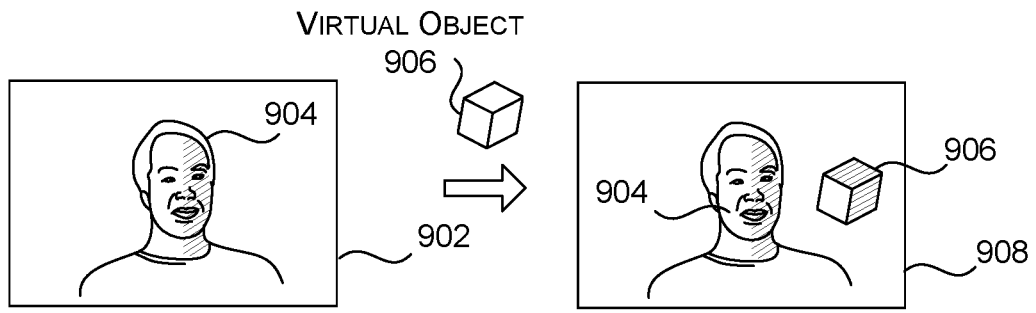
FIG. 9 shows an example of the operation of the object insertion application of FIG. 8.

FIG. 9 shows a particular object image 902 that includes a face 904 of a human subject, which serves as a principal reference object. Assume that a camera of any type captures the object image 902 in a particular physical environment which may be characterized by a relatively wide range of light intensities, e.g., which may correspond to an indoor or outdoor environment, or a mixed indoor/outdoor environment. For example, the camera may correspond to a camera system provided by the HMD 814, which incorporates a video camera in conjunction with a depth camera that captures LDR video. The object insertion application 702 produces an output scene 908 that includes a virtual object 906 and the face 904. Here, the virtual object 906 corresponds to a computer-generated cube that is not present in the physical environment in which the human subject appears. Note that the rendering pipeline 808 applies consistent illumination to both the virtual object 906 and the face 904.

In summary, the object insertion application operates by inferring the illumination characteristics of an environment, given an object image that includes a reference object. It then applies those illumination characteristics to another object within a composite scene. Different systems can vary what constitutes an object image and inserted object in different ways. In another example, the object image may correspond to an image of a real object, but where that real object is not currently present in the user's physical environment at the present time. In another example, the object image may depict a reference object having no real-world counterpart. In another example, the object insertion application 702 is incorporated into a photo-editing application. Here, the object insertion application 702 operates to insert one or more new objects into an original image captured by a camera of any type. In this case, the originally-captured image serves as the object image.

Figure 10:
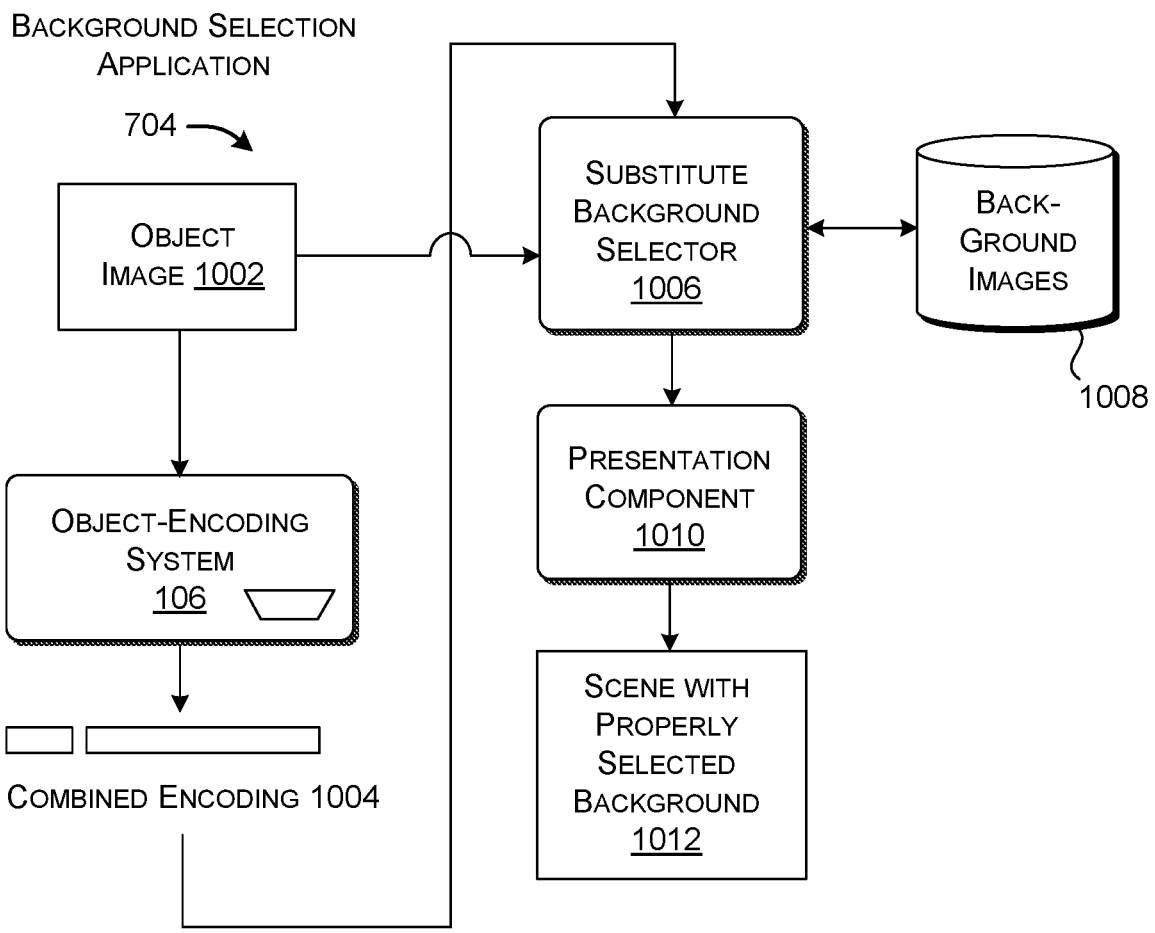
FIG. 10 shows one implementation of a background selection application.

FIG. 10 shows an example of the background selection application 704. The trained object-encoding system 106 maps an object image 1002 to a combined encoding 1004. A substitute background selector 1006 then selects a background image that matches the combined encoding 1004. The substitute background selector 1006 can perform this task in different ways. For example, a data store 1008 can store a plurality of candidate background images. It can also store the combined encodings associated with these respective candidate background images, where these combined encodings are computed in advance using the environment-encoding system 104. The substitute background selector 1006 can choose the background image having a combined encoding that is closest to the combined encoding 1004 of the object image 1002. The substitute background selector 1006 can measure distance between two encodings using any distance metric, such as cosine similarity. Further, the substitute background selector 1006 can use any search algorithm to search the data store 1008, such as an Approximate Nearest Neighbor (ANN) technique.

A presentation component 1010 can produce an output scene 1012 that includes the reference object that appears in the object image 1002 together with the selected background image. In some cases, the presentation component 1010 can perform this task by removing existing (actual) background image content from the scene 1012 and replacing it with the selected background image. The presentation component 1010 presents the output scene 1012 on any type of display device (not shown).

FIG. 11 shows a video conferencing application that incorporates the background selection application 704. Assume that a camera captures an object image 1102 that shows a face 1104 of one of the participants of a video conference. The object image 1102 also includes an actual background image that shows the actual room in which the participant is conducting the video conference. Assume that the room includes a light source 1106 that produces illumination effects that appear in the object image 1102.

The substitute background selector 1006 selects a new background image 1108 that shows a beach scene. The substitute background selector 1006 chooses this scene because it produces illumination effects that are similar to the illumination effects exhibited by the face 1104 in the object image 1102. More formally stated, the substitute background selector 1006 choses this background image 1108 because it includes a combined encoding that is most similar the combined encoding of the object image 1102, and, for this reason, is considered to match the combined encoding of the object image 1102. Next, the presentation component 1010 produces a composite output scene 1110 that includes the new background image 1108 with the face 1104 in the foreground. In other words, the presentation component 1010 removes the actual background image and replaces it with the new background image 1108. The presentation component 1010 can remove the existing background image in different ways, e.g., by using the same technology provided by the background removal component 602 of FIG. 6, or by removing any content that lies at more than a prescribed distance from the camera (which can be identified using any background-removal filter, depth camera determination, etc.).

Different systems can vary the above implementation of the background selection application 704 in different ways. For example, another implementation can synthetically produce a replacement background image based on the combined encoding 1004, rather than extract an existing background image from the data store 1008. For example, the background selection application 704 can include a generative neural network that transforms the combined encoding 1004 into a stylistically-transformed version of the original background image, based on a style chosen by the user, but which nonetheless exhibits the same illumination characteristics as the original background image. In another variation, a photo-editing application can apply the background selection application 704 to change the background of still images.

Although not illustrated in detail in the drawings, the relighting application 706 can operate in a manner similar to the object insertion application 702 and/or the background selection application 704. For example, assume that the virtual object 906 shown in FIG. 9 already has shading applied to it in its original state. The relighting application can use the rendering pipeline 808 to remove the existing illumination effect and apply a new illumination effect that is consistent with the combined encoding 804 of the object image 802.

In conclusion to Section A, the technology described above has various technical merits. For example, the combined encoding constitutes a data structure that provides a succinct way of accurately representing illumination effects within an environment image. This is a particular challenge in outdoor scenes characterized by a high dynamic range. The inventors have discovered that an environment image that captures such a scene may include a relatively small number of pixels of very high intensity. Yet these pixels have a significant role in determining the illumination effects of a reference object that appears in the environment. The technique described herein accurately and efficiently models the effects of these high-intensity pixels by generating a compact and expressive two-part data structure, the first part of which specifically represents the high-intensity pixels. This approach provides a way of preserving and accurately representing the significant role of the high-intensity pixels, without otherwise compromising the fidelity at which it models the lower-intensity parts (and vice versa). Without the use of the compact and expressive two-part data structure described herein, a technique runs the risk of inaccurately estimating the illumination effects of an environment image.

An application can also apply the machine-trained models produced by the training system 102 in a time-efficient and resource-efficient manner. Time-efficient means that an application expeditiously performs its image-processing tasks, in some cases, in a real-time manner. Resource-efficient means that the application efficiently consumes computing resources (e.g., memory resources, computational resources, etc.). For instance, in some implementations, an application can use the trained object-encoding system 106 to convert an object image into a combined encoding in a single pass using the machine-trained object encoder 606 (of FIG. 6), e.g., without complex, time-intensive, and resource-intensive iterative processing to perform non-linear optimization. An application can likewise use the environment decoder 506 (of FIG. 5) to convert a combined encoding into an environment image in a single pass.

B. Illustrative Processes

FIGS. 12-15 show processes that explain the operation of the various systems and applications of Section A in flowchart form. Since the principles underlying the operation of the systems and applications have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

To begin with, FIG. 12 shows a process 1202 that describes one manner of operation of the training system 102 of FIG. 1. In block 1204, the training system 102 accesses a plurality of pairs of images in the training set 202. Each pair of images in the training set includes an environment image that depicts an environment, and an object image that shows a reference object in the environment that is illuminated by one or more light sources within the environment. In block 1206, the training system 102 trains the environment-encoding system 104 as a first training task. In block 1208, the training system 102 trains the object-encoding system 106 as a second training task. The environment-encoding system 104, once trained, converts a first environment image (e.g., which is captured by an HDR camera) into a first combined encoding that represents the first environment image.

The object-encoding system 106, once trained, converts a particular object image showing a particular reference object into a second combined encoding that represents a second environment image, the second environment image depicting an estimate of a particular environment, having one or more light sources, that has produced illumination effects exhibited by the particular reference object in the particular object image. Each given combined encoding associated with a given environment image includes: a first part representing image content in the given environment image that exhibits a first range of intensity levels; and a second part that represents image content in the given environment image that exhibits a second range of intensity levels, at least some of the intensity levels in the first range being higher than any of the intensity levels in the second range. The object-encoding system 106 is iteratively trained in the second training task so that combined encodings produced by the environment-encoding system 104 match combined encodings produced by the environment-encoding system 104, for respective pairs of images in the training set.

Figure 13:
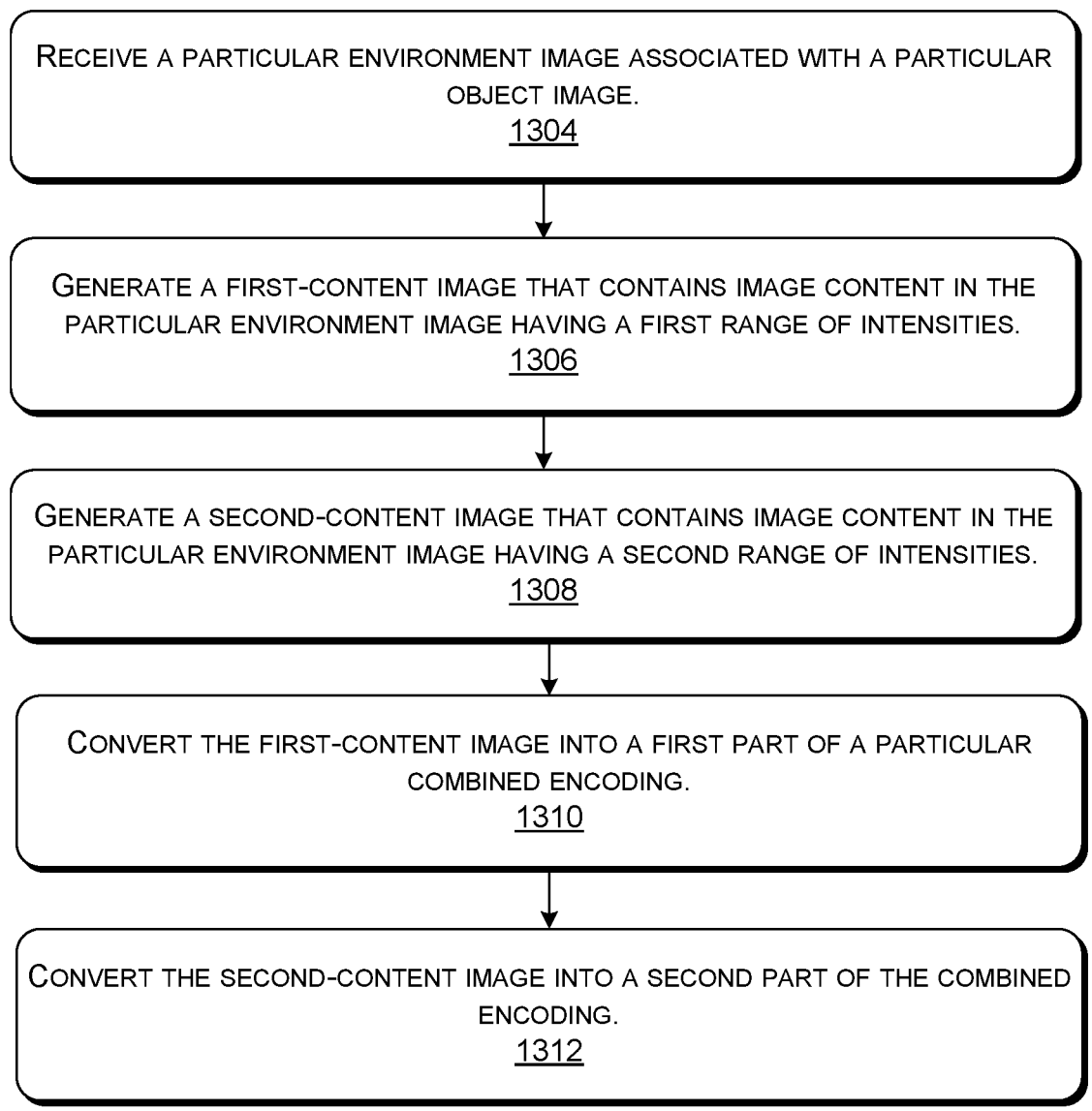
FIG. 13 shows a process that represents one manner of operation of the environment-encoding system of FIG. 4.

FIG. 13 shows a process 1302 that describes one manner of operation of the environment-encoding system 104 of FIG. 4. In block 1304, the environment-encoding system 104 receives a particular environment image associated with a particular object image. In block 1306, the environment-encoding system 104 generates a first-content image that contains image content in the particular environment image having the first range of intensities. In block 1308, the environment-encoding system 104 generates a second-content image that contains image content in the particular environment image having the second range of intensities. In block 1310, the environment-encoding system 104 converts the first-content image into a first part of a particular combined encoding. In block 1312, the environment-encoding system 104 converts the second-content image into a second part of the particular combined encoding.

Figure 14:
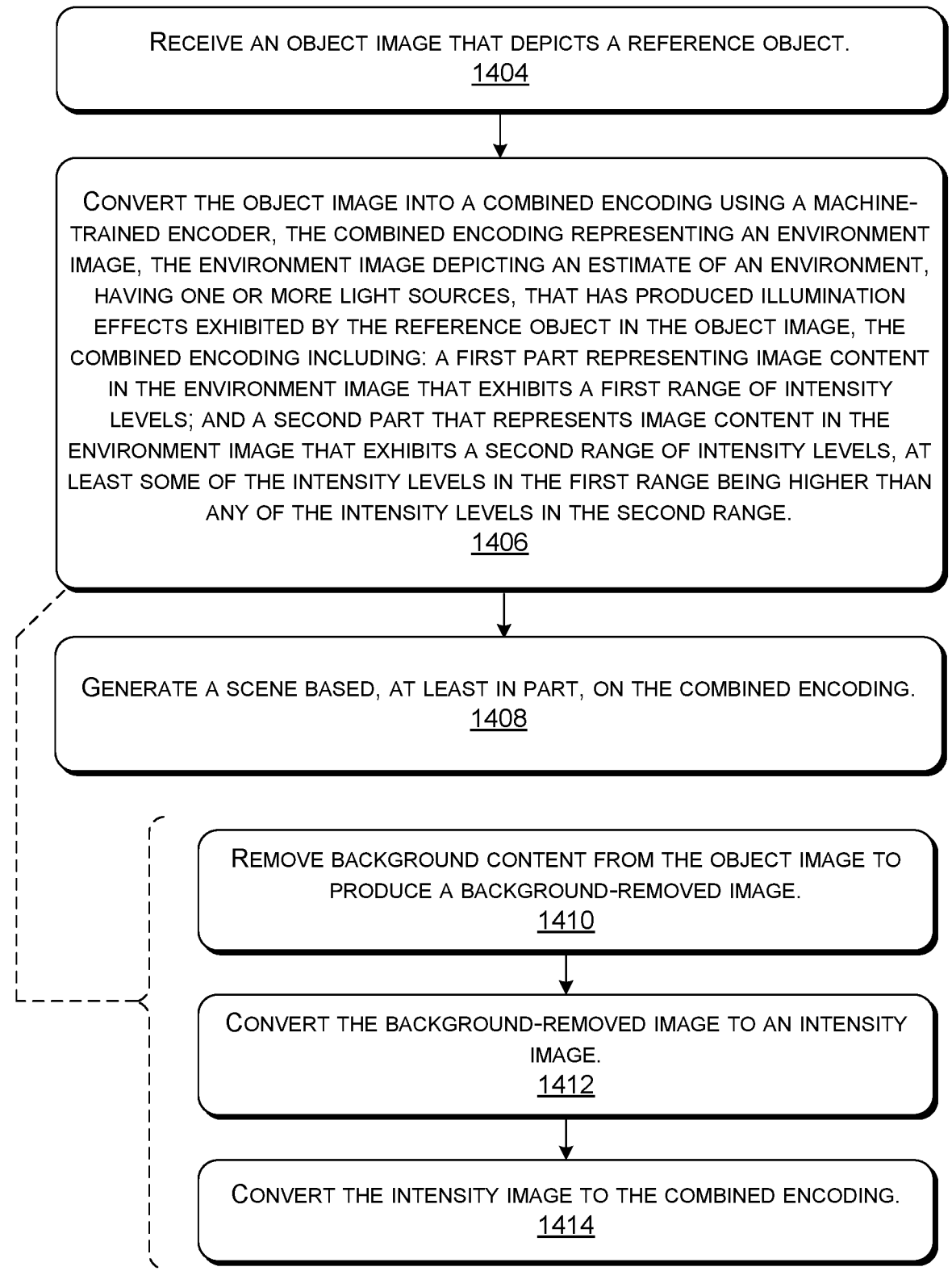
FIG. 14 shows a process that represents one manner of operation of the object-encoding system of FIG. 6.

FIG. 14 shows a process 1402 that represents one manner of operation of the object-encoding system 106 of FIG. 6. In block 1404, the object-encoding system 106 receives an object image that depicts a reference object. In block 1406, the object-encoding system 106 converts the object image into a combined encoding using a machine-trained encoder. The combined encoding represents an environment image, the environment image depicting an estimate of an environment, having one or more light sources, that has produced illumination effects exhibited by the reference object in the object image. The combined encoding includes: a first part representing image content in the environment image that exhibits the first range of intensity levels; and a second part that represents image content in the environment image that exhibits the second range of intensity levels. In block 1408, the object-encoding system 106 generates a scene based, at least in part, on the combined encoding.

The bottom part of FIG. 14 expands on the operation of block 1406. In block 1410, the object-encoding system 106 removes background content from the object image to produce a background-removed image. In block 1412, the object-encoding system 106 converts the background-removed image to an intensity image. In block 1414, the object-encoding system 106 converts the intensity image to the combined encoding.

FIG. 15 shows a process 1502 that represents one manner of operation of an application that uses one or more trained system produced by the training system 102. For instance, the application may correspond to the object insertion application 702 of FIG. 8. In block 1504, the application receives a combined encoding that is produced by transforming an object image that depicts a reference object. The combined encoding represents an environment image, the environment image depicting an estimate of an environment, having one or more light sources, that has produced illumination effects exhibited by the reference object in the object image. The combined encoding includes: a first part representing image content in the environment image that exhibits the first range of intensity levels; and a second part that represents image content in the environment image that exhibits the second range of intensity levels. In block 1506, the application converts the combined encoding into the environment image. In block 1508, the application generates a scene based, at least in part, on the combined encoding.

C. Representative Computing Functionality

FIG. 16 shows an example of computing equipment that can be used to implement any of the systems summarized above. The computing equipment includes a set of user computing devices 1602 coupled to a set of servers 1604 via a computer network 1606. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1606 can be implemented as a local area network, a wide area network (e.g., the Internet), one or more point-to-point links, or any combination thereof.

FIG. 16 also indicates that the training system 102 and any of the applications 124 can be spread across the user computing devices 1602 and/or the servers 1604 in any manner. For instance, in one case, an application is entirely implemented by one or more of the servers 1604. Here, a user can interact with the application via a user computing device, e.g., using a browser application that runs on the user computing device. In another case, an application is entirely implemented by a user computing device in local fashion, in which case no interaction with the servers 1604 is necessary. In another case, the functionality associated with an application is distributed between the servers 1604 and each user computing device.

Figure 17:
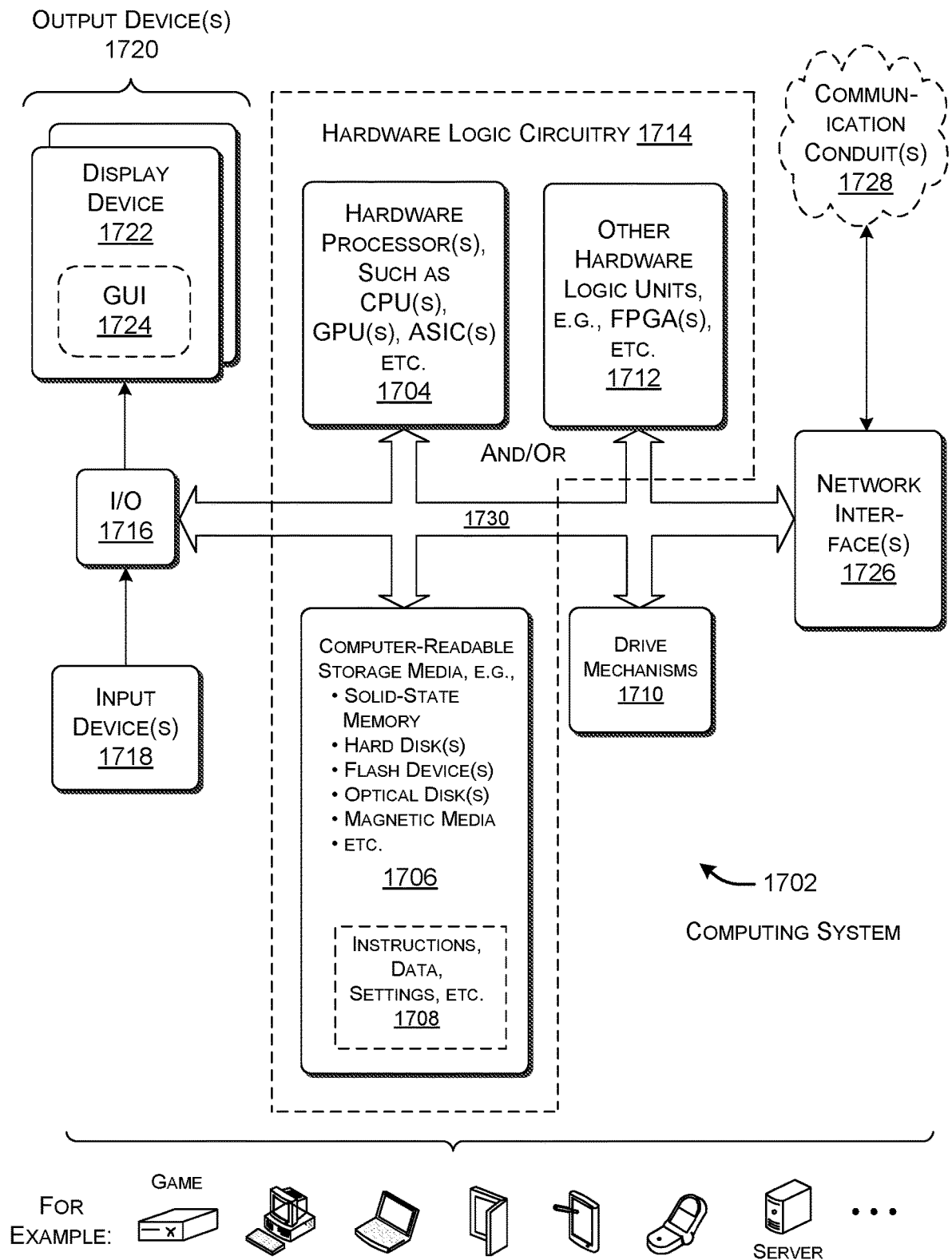
FIG. 17 shows an illustrative type of computing system that can be used to implement any aspect of the features shown in the foregoing drawings.

FIG. 17 shows a computing system 1702 that can be used to implement any aspect of the mechanisms set forth in the above-described figures. The computing system 1702 can be implemented by one or more computing devices. For instance, the type of computing system 1702 shown in FIG. 17 can be used to implement any user computing device or any server shown in FIG. 16. In all cases, the computing system 1702 represents a physical and tangible processing mechanism.

The computing system 1702 can include one or more hardware processors 1704. The hardware processor(s) 1704 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing system 1702 can also include computer-readable storage media 1706, corresponding to one or more computer-readable media hardware units. The computer-readable storage media 1706 retains any kind of information 1708, such as machine-readable instructions, settings, data, etc. Without limitation, the computer-readable storage media 1706 may include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable unit of the computing system 1702. Further, any instance of the computer-readable storage media 1706 may provide volatile or non-volatile retention of information.

The computing system 1702 can utilize any instance of the computer-readable storage media 1706 in different ways. For example, any instance of the computer-readable storage media 1706 may represent a hardware memory unit (such as Random Access Memory (RAM)) for storing transient information during execution of a program by the computing system 1702, and/or a hardware storage unit (such as a hard disk) for retaining/archiving information on a more permanent basis. In the latter case, the computing system 1702 also includes one or more drive mechanisms 1710 (such as a hard drive mechanism) for storing and retrieving information from an instance of the computer-readable storage media 1706.

The computing system 1702 may perform any of the functions described above when the hardware processor(s) 1704 carry out computer-readable instructions stored in any instance of the computer-readable storage media 1706. For instance, the computing system 1702 may carry out computer-readable instructions to perform each block of the processes described in Section B.

Alternatively, or in addition, the computing system 1702 may rely on one or more other hardware logic units 1712 to perform operations using a task-specific collection of logic gates. For instance, the hardware logic unit(s) 1712 may include a fixed configuration of hardware logic gates, e.g., that are created and set at the time of manufacture, and thereafter unalterable. Alternatively, or in addition, the other hardware logic unit(s) 1712 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1714 includes any combination of the hardware processor(s) 1704, the computer-readable storage media 1706, and/or the other hardware logic unit(s) 1712. That is, the computing system 1702 can employ any combination of the hardware processor(s) 1704 that execute machine-readable instructions provided in the computer-readable storage media 1706, and/or one or more other hardware logic unit(s) 1712 that perform operations using a fixed and/or programmable collection of hardware logic gates. More generally stated, the hardware logic circuitry 1714 corresponds to one or more hardware logic units of any type(s) that perform operations based on logic stored in and/or otherwise embodied in the hardware logic unit(s).

In some cases (e.g., in the case in which the computing system 1702 represents a user computing device), the computing system 1702 also includes an input/output interface 1716 for receiving various inputs (via input devices 1718), and for providing various outputs (via output devices 1720). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1722 and an associated graphical user interface presentation (GUI) 1724. The display device 1722 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1702 can also include one or more network interfaces 1726 for exchanging data with other devices via one or more communication conduits 1728. One or more communication buses 1730 communicatively couple the above-described units together.

The communication conduit(s) 1728 can be implemented in any manner, e.g., by a local area computer network, a wide area computer network (e.g., the Internet), point-to-point connections, etc., or any combination thereof. The communication conduit(s) 1728 can include any combination of hardwired links, wireless links, routers, gateway functionality, name servers, etc., governed by any protocol or combination of protocols.

FIG. 17 shows the computing system 1702 as being composed of a discrete collection of separate units. In some cases, the collection of units may correspond to discrete hardware units provided in a computing device chassis having any form factor. FIG. 17 shows illustrative form factors in its bottom portion. In other cases, the computing system 1702 can include a hardware logic unit that integrates the functions of two or more of the units shown in FIG. 1. For instance, the computing system 1702 can include a system on a chip (SoC or SOC), corresponding to an integrated circuit that combines the functions of two or more of the units shown in FIG. 17.

The following summary provides a non-exhaustive set of illustrative examples of the technology set forth herein.

According to a first example, a computing system 1702 is described for processing image information. The computing system 1702 includes hardware logic circuitry 1714, the hardware logic circuitry 1714 including: (a) one or more hardware processors 1704 that perform operations by executing machine-readable instructions 1708 stored in a memory 1706, and/or (b) one or more other hardware logic units 1712 that perform the operations using a task-specific collection of logic gates. The operations include: receiving 1404 an object image 112 that depicts a reference object 118; and converting 1406 the object image 112 into a combined encoding 114 using a machine-trained encoder 606 that is implemented by the hardware logic circuitry 1714. The combined encoding 114 represents an environment image 108, the environment image 108 depicting an estimate of an environment, having one or more light sources (e.g., 116), that has produced illumination effects exhibited by the reference object 118 in the object image 112. The combined encoding 114 includes: a first part 132 representing image content in the environment image 108 that exhibits a first range of intensity levels; and a second part 134 that represents image content in the environment image 108 that exhibits a second range of intensity levels, at least some of the intensity levels in the first range being higher than any of the intensity levels in the second range. The operations further include generating 1408 a scene based, at least in part, on the combined encoding 114.

As set forth in Sections A and B, the combined encoding 114 constitutes a compact and expressive two-part data structure that provides a way of accurately and efficiently capturing the significant role that high-intensity parts of an environment play in illuminating objects in an environment. This ultimately allows the computing system 1702 to generate a scene having accurate illumination effects. The machine-trained encoder 606 used by the computing system 1702 can also produce these effects in a time-efficient and resource-efficient manner, e.g., by directly mapping the object image 112 to the combined encoding 114.

According to a second example, the reference object depicts a face of a human subject captured by a camera.

According to a third example, the first part of the combined encoding includes, at least in part, at least one value that represents a position of at least one light source in the environment, and at least one value that represents an intensity of the light source(s).

According to a fourth example, the environment image described by the combined encoding has a broader range of intensity values compared to the object image.

According to a fifth example, the operation of converting includes: removing background content from the object image to produce a background-removed image; converting the background-removed image to an intensity image that represents intensity values within the background-removed image; and converting the intensity image to the combined encoding.

According to a sixth example, the operation of generating includes: converting the combined encoding into the environment image using a pre-trained decoder; and using the environment image in a rendering pipeline to produce the scene, the operation of using including applying illumination effects to at least one virtual object in the scene based on the environment image.

According to a seventh example, the operation of generating includes: selecting a background image that matches the combined encoding; and composing the scene to include the background image and the reference object.

According to an eighth example, relating to the seventh example, the reference object is a video conference participant.

According to a ninth example, relating to the seventh example, the operation of composing replaces an actual background image captured by a camera with the background image that is selected.

According to a tenth example, the machine-trained encoder is a convolutional neural network.

According to an eleventh example, the machine-trained encoder is trained using a training set that includes a plurality of object images, the plurality of object images being associated with respective combined encodings. Each particular combined encoding in the combined encodings is associated with a particular environment image, and is generated by: receiving the particular environment image associated with a particular object image; generating a first-content image that contains image content in the particular environment image having the first range of intensities; generating a second-content image that contains image content in the particular environment image having the second range of intensities; converting the first-content image into a particular first part of the particular combined encoding; and converting the second-content image into a particular second part of the particular combined encoding.

According to a twelfth example, relating to the eleventh example, the operation of converting the first-content image is performed by fitting the first-content image to at least one Gaussian mixture model.

According to a thirteenth example, relating to the eleventh example, the operation of converting the second-content image is performed using another machine-trained encoder that is implemented by the hardware logic circuitry, and wherein the other machine-trained encoder is part of a pre-trained auto-encoder that also includes a decoder.

According to a fourteenth example, a computer-readable storage medium for storing computer-readable instructions is described. The computer-readable instructions, when executed by one or more hardware processors, perform a method that includes receiving a combined encoding that is produced by transforming an object image that depicts a reference object. The combined encoding represent an environment image, the environment image depicting an estimate of an environment, having one or more light sources, that has produced illumination effects exhibited by the reference object in the object image. The combined encoding includes: a first part representing image content in the environment image that exhibits a first range of intensity levels; and a second part that represents image content in the environment image that exhibits a second range of intensity levels, at least some of the intensity levels in the first range being higher than any of the intensity levels in the second range. The method also includes: converting the combined encoding into the environment image; and generating a scene based, at least in part, on the combined encoding.

According to a fifteenth example, relating to the fourteenth example, the operation of generating a scene includes applying illumination effects to at least one virtual object in the scene based on the environment image.

According to a sixteenth example, a computer-implemented method for processing image information is described that includes accessing a plurality of pairs of images in a training set. Each pair of images in the training set includes an environment image that depicts an environment, and an object image that shows a reference object in the environment that is illuminated by one or more light sources within the environment. The method further includes, in a first training task, training an environment-encoding system, and, a second training task, training an object-encoding system. The environment-encoding system, once trained, converts a first environment image into a first combined encoding that represents the first environment image. The object-encoding system, once trained, converts a particular object image showing a particular reference object into a second combined encoding that represents a second environment image, the second environment image depicting an estimate of a particular environment, having one or more light sources, that has produced illumination effects exhibited by the particular reference object in the particular object image. A given combined encoding associated with a given environment image including: a first part representing image content in the given environment image that exhibits a first range of intensity levels; and a second part that represents image content in the given environment image that exhibits a second range of intensity levels, at least some of the intensity levels in the first range being higher than any of the intensity levels in the second range. The object-encoding system is iteratively trained in the second training task so that combined encodings produced by the environment-encoding system match combined encodings produced by the object-encoding system, for respective pairs of images in the training set.

According to a seventeenth example, relating to the sixteenth example, once trained, the object-encoding system operates on the particular object image by: removing background content from the particular object image to produce a background-removed image; converting the background-removed image to an intensity image that represents intensity values within the background-removed image; and converting the intensity image to the second combined encoding using a machine-trained encoder.

According to an eighteenth example, relating to the sixteenth example, the environment-encoding system, once trained, operates on the first environment image by: receiving the first environment image; generating a first-content image that contains image content in the first environment image having the first range of intensities; generating a second-content image that contains image content in the first environment image having the second range of intensities; converting the first-content image into a particular first part of the first combined encoding; and converting the second-content image into a particular second part of the first combined encoding using a machine-trained encoder.

According to a nineteenth example, relating to the eighteenth example, the operation of converting the first-content image is performed by fitting the first-content image to at least one Gaussian mixture model.

According to a twentieth example, relating to the eighteenth example, the machine-trained encoder is part of an auto-encoder that also includes a decoder, and the first training task involves training the auto-encoder.

A twenty-first aspect corresponds to any combination (e.g., any logically consistent permutation or subset) of the above-referenced first through twentieth examples.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for processing image information, comprising:
hardware logic circuitry, the hardware logic circuitry including: (a) one or more hardware processors that perform operations by executing machine-readable instructions stored in a memory, and/or (b) one or more other hardware logic units that perform the operations using a task-specific collection of logic gates, the operations including:
receiving an object image that depicts a reference object;
converting the object image into a combined encoding using a machine-trained encoder that is implemented by the hardware logic circuitry, the combined encoding representing an environment image, the environment image depicting an estimate of an environment, having one or more light sources, that has produced illumination effects exhibited by the reference object in the object image,
the combined encoding including: a first part representing image content in the environment image that exhibits a first range of intensity levels; and a second part that represents image content in the environment image that exhibits a second range of intensity levels, at least some of the intensity levels in the first range being higher than any of the intensity levels in the second range; and
generating a scene based, at least in part, on the combined encoding.

2. The computing system of claim 1, wherein the reference object depicts a face of a human subject captured by a camera.

3. The computing system of claim 1, wherein the first part of the combined encoding includes, at least in part, at least one value that represents a position of at least one light source in the environment, and at least one value that represents an intensity of said at least one light source.

4. The computing system of claim 1, wherein the environment image described by the combined encoding has a broader range of intensity values compared to the object image.

5. The computer system of claim 1, wherein said converting includes:
removing background content from the object image to produce a background-removed image;
converting the background-removed image to an intensity image that represents intensity values within the background-removed image; and
converting the intensity image to the combined encoding.

6. The computing system of claim 1, wherein said generating includes:
converting the combined encoding into the environment image using a pre-trained decoder; and
using the environment image in a rendering pipeline to produce the scene, said using including applying illumination effects to at least one virtual object in the scene based on the environment image.

7. The computing system of claim 1, wherein said generating includes:
selecting a background image that matches the combined encoding; and
composing the scene to include the background image and the reference object.

8. The computing system of claim 7, wherein the reference object is a video conference participant.

9. The computing system of claim 7, wherein said composing replaces an actual background image captured by a camera with the background image that is selected.

10. The computing system of claim 1, wherein the machine-trained encoder is a convolutional neural network.

11. The computing system of claim 1,
wherein the machine-trained encoder is trained using a training set that includes a plurality of object images,
the plurality of object images being associated with respective combined encodings,
each particular combined encoding in the combined encodings being associated with a particular environment image, and being generated by:
receiving the particular environment image associated with a particular object image;
generating a first-content image that contains image content in the particular environment image having the first range of intensities;
generating a second-content image that contains image content in the particular environment image having the second range of intensities;
converting the first-content image into a particular first part of the particular combined encoding; and
converting the second-content image into a particular second part of the particular combined encoding.

12. The computing system of claim 11, wherein said converting the first-content image is performed by fitting the first-content image to at least one Gaussian mixture model.

13. The computing system of claim 11, wherein said converting the second-content image is performed using another machine-trained encoder that is implemented by the hardware logic circuitry, and wherein the other machine-trained encoder is part of a pre-trained auto-encoder that also includes a decoder.

14. A computer-readable storage medium for storing non-transitory computer-readable instructions, the computer-readable instructions, when executed by one or more hardware processors, performing a method that comprises:
receiving a combined encoding that is produced by transforming an object image that depicts a reference object,
the combined encoding representing an environment image, the environment image depicting an estimate of an environment, having one or more light sources, that has produced illumination effects exhibited by the reference object in the object image,
the combined encoding including: a first part representing image content in the environment image that exhibits a first range of intensity levels; and a second part that represents image content in the environment image that exhibits a second range of intensity levels, at least some of the intensity levels in the first range being higher than any of the intensity levels in the second range;
converting the combined encoding into the environment image; and
generating a scene based, at least in part, on the combined encoding.

15. The non-transitory computer-readable storage medium of claim 14, wherein said generating a scene includes applying illumination effects to at least one virtual object in the scene based on the environment image.

16. A computer-implemented method for processing image information, comprising:
accessing a plurality of pairs of images in a training set, each pair of images in the training set including an environment image that depicts an environment, and an object image that shows a reference object in the environment that is illuminated by one or more light sources within the environment;

in a first training task, training an environment-encoding system; and in a second training task, training an object-encoding system, the environment-encoding system, once trained, converting a first environment image into a first combined encoding that represents the first environment image, the object-encoding system, once trained, converting a particular object image showing a particular reference object into a second combined encoding that represents a second environment image, the second environment image depicting an estimate of a particular environment, having one or more light sources, that has produced illumination effects exhibited by the particular reference object in the particular object image, each given combined encoding associated with a given environment image including: a first part representing image content in the given environment image that exhibits a first range of intensity levels; and a second part that represents image content in the given environment image that exhibits a second range of intensity levels, at least some of the intensity levels in the first range being higher than any of the intensity levels in the second range, the object-encoding system being iteratively trained in the second training task so that combined encodings produced by the environment-encoding system match combined encodings produced by the object-encoding system, for respective pairs of images in the training set.

17. The computer-implemented method of claim 16, wherein, once trained, the object-encoding system operates on the particular object image by:

removing background content from the particular object image to produce a background-removed image;

converting the background-removed image to an intensity image that represents intensity values within the background-removed image; and converting the intensity image to the second combined encoding using a machine-trained encoder.

18. The computer-implemented method of claim 16, wherein the environment-encoding system, once trained, operates on the first environment image by:

receiving the first environment image;

generating a first-content image that contains image content in the first environment image having the first range of intensities;

generating a second-content image that contains image content in the first environment image having the second range of intensities;

converting the first-content image into a particular first part of the first combined encoding; and converting the second-content image into a particular second part of the first combined encoding using a machine-trained encoder.

19. The computer-implemented method of claim 18, wherein said converting the first-content image is performed by fitting the first-content image to at least one Gaussian mixture model.

20. The computer-implemented method of claim 18, wherein the machine-trained encoder is part of an autoencoder that also includes a decoder, and wherein the first training task involves training the autoencoder.

\* \* \* \* \*